(12) United States Patent
Park et al.

(10) Patent No.: US 10,908,703 B2
(45) Date of Patent: Feb. 2, 2021

(54) USER TERMINAL DEVICE AND METHOD FOR CONTROLLING THE USER TERMINAL DEVICE THEREOF

(71) Applicant: SAMSUNG ELECTRONICS CO., LTD., Suwon-si (KR)

(72) Inventors: Mi-ra Park, Seoul (KR); Sung-bin Kuk, Suwon-si (KR); Hark-joon Kim, Ansan-si (KR); Sang-il Lee, Seongnam-si (KR); Min-kyu Jung, Seoul (KR); Seong-hoon Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/508,548

(22) Filed: Jul. 11, 2019

(65) Prior Publication Data

US 2019/0332195 A1    Oct. 31, 2019

Related U.S. Application Data

(63) Continuation of application No. 16/013,000, filed on Jun. 20, 2018, now Pat. No. 10,372,238, which is a
(Continued)

(30) Foreign Application Priority Data

Sep. 29, 2014  (KR) .................. 10-2014-0130519

(51) Int. Cl.
*G09G 5/00*     (2006.01)
*G06F 3/0354*   (2013.01)
(Continued)

(52) U.S. Cl.
CPC ........ *G06F 3/03543* (2013.01); *G06F 3/0346* (2013.01); *G06F 3/0354* (2013.01);
(Continued)

(58) Field of Classification Search
CPC ............. G06F 3/03543; G06F 3/04815; G06F 3/0482; G06F 3/0484; G06F 3/04845;
(Continued)

(56) References Cited

U.S. PATENT DOCUMENTS 5,936,613 A    8/1999  Jaeger et al.
7,214,066 B2   5/2007  Marcus
(Continued)

FOREIGN PATENT DOCUMENTS

CN    101504582 A    8/2009
EP    2 105 844      9/2009
(Continued)

OTHER PUBLICATIONS

U.S. Appl. No. 16/013,000, filed Jun. 20, 2018; Park et al.
(Continued)

*Primary Examiner* — Joe H Cheng
(74) *Attorney, Agent, or Firm* — Nixon & Vanderhye P.C.

(57) ABSTRACT

A user terminal device and a control method are provided. The user terminal device includes a display, a sensor configured to sense a user interaction on the display, and a controller configured to, in response to a user interaction being sensed by the sensor of a touch being made by an input device of a polyhedral shape that includes different touch patterns on each of a plurality of surfaces, control a function of the user terminal device according to a touch pattern on a touched surface among the plurality of surfaces.

9 Claims, 32 Drawing Sheets

Related U.S. Application Data continuation of application No. 15/901,956, filed on Feb. 22, 2018, now Pat. No. 10,007,360, which is a continuation of application No. 15/690,384, filed on Aug. 30, 2017, now Pat. No. 9,927,885, which is a continuation of application No. 14/863,882, filed on Sep. 24, 2015, now Pat. No. 9,766,722.

(51) Int. Cl.

| | | |
|---|---|---|
| *G06F 3/0482* | (2013.01) | |
| *G06F 3/0484* | (2013.01) | |
| *G06F 3/0488* | (2013.01) | |
| *G06F 3/044* | (2006.01) | |
| *G06F 3/0346* | (2013.01) | |
| *G06F 3/039* | (2013.01) | |

(52) U.S. Cl.
CPC ............ *G06F 3/0393* (2019.05); *G06F 3/044* (2013.01); *G06F 3/0482* (2013.01); *G06F 3/04842* (2013.01); *G06F 3/04845* (2013.01); *G06F 3/04883* (2013.01); *G06F 2203/04802* (2013.01); *G06F 2203/04807* (2013.01)

(58) Field of Classification Search
CPC ................ G06F 3/0487; G06F 3/0488; G06F 2203/04802; Y10S 715/979
See application file for complete search history.

(56) References Cited

U.S. PATENT DOCUMENTS

| | | |
|---|---|---|
| 7,216,305 B1 | 5/2007 | Jaeger |
| 8,239,784 B2 | 8/2012 | Hotelling et al. |
| 8,358,286 B2 | 1/2013 | Cannon |
| 8,661,369 B2 | 2/2014 | Heo |
| 9,513,744 B2 | 12/2016 | Pryor |
| 9,766,722 B2 | 9/2017 | Park et al. |
| 9,880,643 B1 | 1/2018 | Park et al. |
| 10,007,360 B1 | 6/2018 | Park |
| 2003/0112279 A1 | 6/2003 | Irimajiri |
| 2006/0020898 A1 | 1/2006 | Kim |
| 2008/0238879 A1 | 10/2008 | Jaeger et al. |
| 2010/0093400 A1 | 4/2010 | Ju et al. |
| 2010/0315417 A1 | 12/2010 | Cho |
| 2011/0053641 A1 | 3/2011 | Lee |
| 2011/0083078 A1 | 4/2011 | Ju |
| 2011/0084893 A1 | 4/2011 | Lee |
| 2011/0134110 A1 | 6/2011 | Song |
| 2011/0157065 A1 | 6/2011 | Murata |
| 2011/0227871 A1 | 9/2011 | Cannon |
| 2013/0072263 A1 | 3/2013 | Kim |
| 2013/0127911 A1 | 5/2013 | Brown |
| 2013/0159902 A1 | 6/2013 | Kwak et al. |
| 2013/0308243 A1 | 11/2013 | Smoot et al. |
| 2014/0053102 A1 | 2/2014 | Lee et al. |
| 2014/0078086 A1* | 3/2014 | Bledsoe ................. G06F 3/0488 345/173 |
| 2014/0210748 A1 | 7/2014 | Narita |
| 2015/0067603 A1 | 3/2015 | Tanaka |
| 2015/0082162 A1 | 3/2015 | Cho |
| 2015/0135129 A1 | 5/2015 | Kwon |
| 2015/0169080 A1 | 6/2015 | Choi et al. |
| 2015/0228946 A1 | 8/2015 | Kang et al. |
| 2015/0261378 A1* | 9/2015 | Lee ........................ G06F 3/0416 715/765 |
| 2016/0110011 A1 | 4/2016 | Park |

FOREIGN PATENT DOCUMENTS

| | | |
|---|---|---|
| KR | 10-2010-0099828 | 9/2010 |
| KR | 10-2014-0024554 | 3/2014 |
| KR | 10-2014-0086805 | 7/2014 |
| WO | WO 2013-085191 | 6/2013 |
| WO | WO 2013-085334 | 6/2013 |
| WO | WO 2014-047675 | 4/2014 |
| WO | WO 2014/106719 | 7/2014 |

OTHER PUBLICATIONS

U.S. Appl. No. 15/901,956, filed Feb. 22, 2018; Park et al.
U.S. Appl. No. 15/690,384, filed Aug. 30, 2017; Park et al.
U.S. Appl. No. 14/863,882, filed Sep. 24, 2015; Park et al.
EP Search Report dated Aug. 29, 2017 for EP Application No. 15846561.7.
PCT International Search Report for PCT/KR2015/010173 dated Jan. 29, 2016.
U.S. Appl. No. 15/718,105, filed Sep. 28, 2017; Park et al.
https://youtube/p8Qw6Idudvo—Fun Day of Science.
https://youtube/IETdiv5RarO—Sony Wonder Technology Lab.
https://youtube/Cvb-QABLSxg—Sony Wonder Technology Lab.
Notice of Allowance dated Nov. 30, 2017 for U.S. Appl. No. 15/718,105; Park et al.
EP Examination Report dated Apr. 12, 2018 for EP Application No. 15846561.7.
Summons to attend Oral Proceedings for EP Application No. 15846561.7 issued Nov. 15, 2018.
EP Decision to Refuse dated Sep. 19, 2019 for EP Application No. 15846561.7.
Chinese Office Action dated Oct. 12, 2019 for CN Application No. 201580058598.2.
Chinese Office Action dated Mar. 23, 2020 for CN Application No. 201580058598.2.
Extended European Search Report dated Apr. 7, 2020 for EP Application No. 19210083.2.
Chinese Office Action dated Jul. 22, 2020 for Chinese Application No. 201580058598.2.
India Examination Report dated Aug. 3, 2020 for India Application No. 201717014451.

\* cited by examiner

USER TERMINAL DEVICE AND METHOD FOR CONTROLLING THE USER TERMINAL DEVICE THEREOF

CROSS-REFERENCE TO RELATED APPLICATIONS

This application is a Continuation of U.S. application Ser. No. 16/013,000, filed Jun. 20, 2018 (now U.S. Pat. No. 10,372,238), which is a Continuation of U.S. application Ser. No. 15/901,956, filed Feb. 22, 2018 (now U.S. Pat. No. 10,007,360), which is a Continuation of U.S. application Ser. No. 15/690,384, filed Aug. 30, 2017 (now U.S. Pat. No. 9,927,885), which is a Continuation of U.S. application Ser. No. 14/863,882, filed Sep. 24, 2015 (now U.S. Pat. No. 9,766,722), which claims priority to KR 10-2014-0130519, filed Sep. 29, 2014, the entire contents of each of which are all hereby incorporated herein by reference. This application is also related to U.S. application Ser. No. 15/718,105, filed Sep. 28, 2017 (now U.S. Pat. No. 9,880,643).

TECHNICAL FIELD

The present disclosure relates to a methods and apparatuses consistent with the various embodiments to a user terminal device and a control method thereof. More particularly, the present disclosure relates to a user terminal device that is controlled by a polyhedron-shaped input device, and a control method thereof.

BACKGROUND

These days, various functions are being provided by various user terminal devices (for example, smart phones, tablet personal computers (PCs), notebooks, and PCs and the like). For example, the latest user terminal devices not only perform call functions but also other various functions such as internet search functions, contents creation and editing functions, schedule managing functions, and health managing functions and the like.

However, these various user terminal devices increased the steps for entering menus using user touch in order to perform such various functions, causing inconvenience to users according to the related art.

Furthermore, in these types of various user terminal devices, to execute a new operation, a user has to use the certain screen area, also causing inconvenience of having to make multiple manipulations according to the related art.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal device capable of performing various functions by sensing an input device having different touch patterns on each of a plurality of surfaces and a control method thereof.

In accordance with an aspect of the present disclosure, a user terminal device is provided. The user terminal device includes a display, a sensor configured to sense a user interaction on the display, and a controller configured to, in response to a user interaction sensed by the sensor of a touch being made by an input device of a polyhedral shape that includes different touch patterns on each of a plurality of surfaces, control a function of the user terminal device according to a touch pattern on a touched surface among the plurality of surfaces.

Each of the plurality of surfaces of the input device may have a corresponding function, and the controller may sense the touch pattern on the touched surface of the input device, determine the touched surface based on the sensed touch pattern, and perform the function corresponding to the determined touched surface.

The controller, in response to a user interaction sensed by the sensor of the touch being made by the input device, may control the display to display a user interface (UI) that includes a plurality of menus for controlling the user terminal device on an area surrounding an area touched by the input device according to the touch pattern on the touched surface among the plurality of surfaces.

The controller, in response to a user interaction sensed by the sensor of the touch being made by the input device and then dragged to one of the plurality of menus while the UI including the plurality of menus is being displayed, may perform a function corresponding to the menu to which the drag has been made.

The controller, in response to a drag interaction sensed by the sensor of a touch being made by a first surface among the plurality of surfaces of the input device on a first point of the display and then dragged to a second point, may control the display to create a new screen on an area where the drag interaction is sensed.

The controller may create a new type of screen according to the sensed touch pattern on the first surface.

The controller, in response to a turn around interaction sensed by the sensor of a touch being made by a first surface of the input device and then by a second surface of the input device, may perform a function corresponding to the turn around interaction of the input device.

The user terminal device may further include a storage, wherein the controller, in response to a user interaction sensed by the sensor of a touch being made by a first surface of the input device and then by a second surface of the input device, and then a tap interaction sensed by the sensor of a first item among at least one item has been tapped by the second surface of the input device, may store data corresponding to the sensed first item where the tap interaction is sensed in the storage.

The controller, in response to a rotating interaction sensed by the sensor of the input device being rotated while maintaining a touch made by a first surface on a first item among at least one item being displayed on the display, may perform a function corresponding to the first surface regarding the first item.

The controller, in response to a rotation interaction sensed by the sensor of the input device being rotated while maintaining a touch made by a first surface on a first point of the user terminal device with the display showing a waiting screen, may adjust a volume of the user terminal device according to the rotating interaction of the input device.

In accordance with an aspect of the present disclosure, a control method of a user terminal device is provided. The method includes sensing a user interaction of a touch being made by an input device of a polyhedral shape that includes different touch patterns on each of a plurality of surfaces, and performing a function of the user terminal device according to a touch pattern on a touched surface among the plurality of surfaces.

Each of the plurality of surfaces of the input device may have a corresponding function, and wherein the performing of the function of the user terminal device may include sensing the touch pattern on the touched surface of the input device, determining the touched surface based on the sensed touch pattern, and performing the function corresponding to the determined touched surface.

The performing a function of the user terminal device may include, in response to a user interaction sensed by the sensor of the touch being made by the input device, controlling the display to display a UI that includes a plurality of menus for controlling the user terminal device on an area surrounding an area touched by the input device according to the touch pattern on the touched surface among the plurality of surfaces.

The performing a function of the user terminal device may include, in response to a user interaction sensed by the sensor of the touch being made by the input device and then dragged to one of the plurality of menus while the UI including the plurality of menus is being displayed, performing a function corresponding to the menu to which the drag has been made.

The performing a function of the user terminal device may include, in response to a drag interaction sensed by the sensor of a touch being made by a first surface among the plurality of surfaces of the input device on a first point of the display and then dragged to a second point, controlling the display to create a new screen on an area where the drag interaction is sensed.

The creating of the new screen may include creating a new type of screen according to the sensed touch pattern on the first surface.

The performing a function of the user terminal device may include, in response to a turn around interaction sensed by the sensor of a touch being made by a first surface of the input device and then by a second surface of the input device, performing a function corresponding to the turn around interaction of the input device.

The performing a function of the user terminal device may include, in response to a user interaction sensed by the sensor of a touch being made by a first surface of the input device and then by a second surface of the input device, and then a tap interaction sensed by the sensor of a first item among at least one item has been tapped by the second surface of the input device, storing data corresponding to the sensed first item where the tap interaction is sensed in a storage of the user terminal device.

The performing a function of the user terminal device may include, in response to a rotating interaction sensed by the sensor of the input device being rotated while maintaining a touch made by a first surface on a first item among at least one item being displayed on the display, performing a function corresponding to the first surface regarding the first item.

The performing a function of the user terminal device may include, in response to a rotation interaction sensed by the sensor of the input device being rotated while maintaining a touch made by a first surface on a first point of the user terminal device with the display showing a waiting screen, adjusting a volume of the user terminal device according to the rotating interaction of the input device.

According to the aforementioned various embodiments of the present disclosure, the user terminal device may not only perform various manipulations through the polyhedral shaped input device but may also provide a new interaction where various fun elements have been added. Furthermore, since the polyhedral input device does not need any additional power, it is possible to perform various functions using the input device where a battery is unnecessary.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
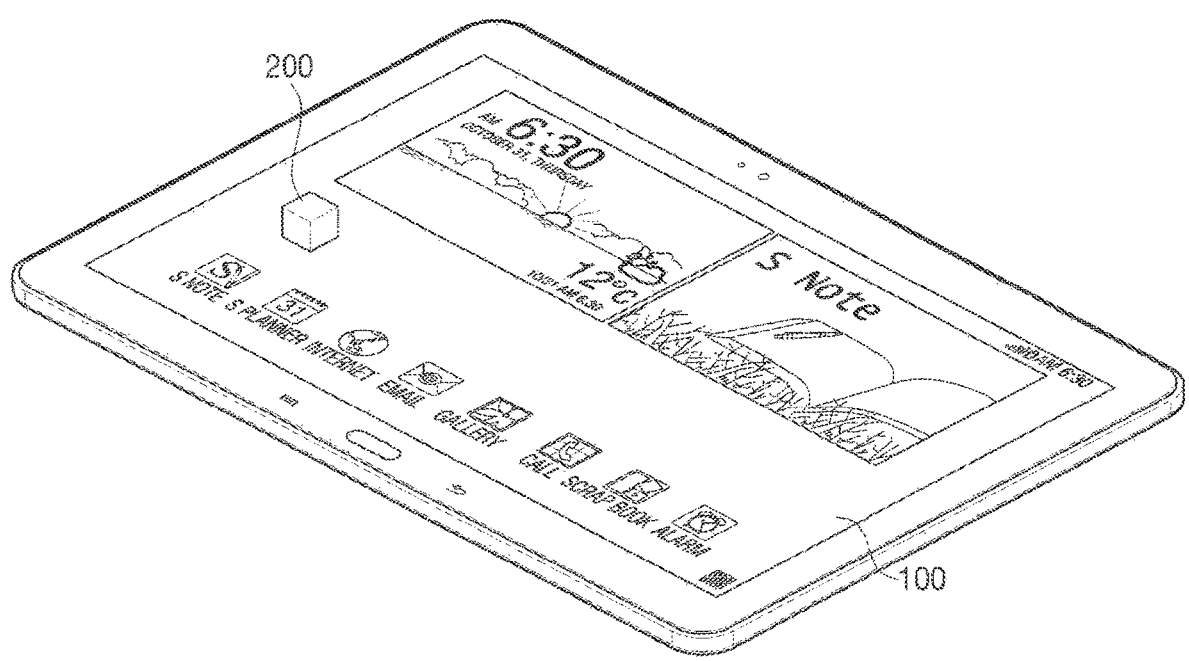
FIG. 1 is a view illustrating a user terminal device and an input device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, like drawing reference numerals are used for the like elements, even in different drawings. The matters defined in the description, such as detailed construction and elements, are provided to assist in a comprehensive understanding of various embodiments of the present disclosure. However, various embodiments of the present disclosure can be practiced without those specifically defined matters. Also, well-known functions or constructions are not described in detail since they would obscure the application with unnecessary detail.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, operations, and elements exist or are added.

In the embodiments of the present disclosure, a 'module' or 'unit' performs at least one function or operation, and may be realized as hardware or software, or a combination thereof. Furthermore, a plurality of 'modules' or a plurality of 'units' may be integrated into at least one module and be realized as at least one processor (not illustrated) except for when they need to be realized as a certain hardware.

Hereinafter, various embodiments of the present disclosure will be explained with reference to the drawings attached. FIG. 1 is a view illustrating a user terminal device 100 and an input device 200 according to an embodiment of the present disclosure. Herein, the user terminal device 100 may be a tablet personal computer (PC) as illustrated in FIG. 1, but without limitation, and thus the user terminal device 100 may be another type of user terminal device (for example, smart phone, notebook PC, smart TV, desktop PC, and kiosk and the like). The input device 200 may have a polyhedral shape with a plurality of surfaces. For example, as illustrated in FIG. 1, the input device 200 may have a regular hexahedral shape, but without limitation, and thus the input device 200 may have any one of various polyhedral shapes such as regular hexahedron, and regular octahedron and the like. Especially, the input device 200 may include different touch patterns in each of the plurality of surfaces.

In a case where one of the plurality of surfaces of the input device 200 touches the user terminal device 100, the user terminal device 100 may control a function of the user terminal device 100 according to a touch pattern on the touched surface. Various functions that may be performed according to user interactions of the user terminal device 100 using the input device 200 will be explained in further detail later on.

Figure 2:
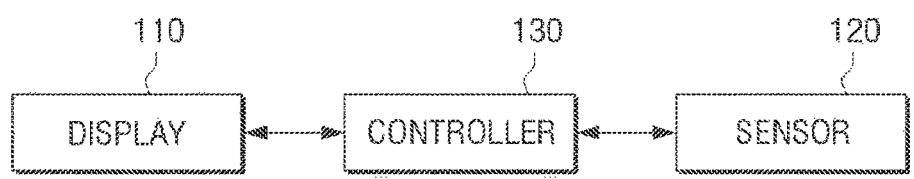
FIG. 2 is a block diagram schematically illustrating a configuration of a user terminal device according to an embodiment of the present disclosure.

FIG. 2 is a block diagram schematically illustrating a configuration of the user terminal device 100 according to an embodiment of the present disclosure.

Referring to FIG. 2, the user terminal device 100 includes a display 110, sensor 120, and controller 130.

The display 110 displays an image content received from outside. Especially, when the input device 200 having the polyhedral shape is touched on the display 110, the display 110 may display a user interface (UI) near the area touched by the input device 200.

The sensor 120 senses a user interaction on the display 110. More specifically, the sensor 120 may sense a user interaction of a touch being made on the display 110 by the input device 200 having the polyhedral shape. Herein, the sensor 120 may sense different types of touch patterns formed on each of the plurality of surfaces included in the input device 200.

The controller 130 may control the overall operations of the user terminal device 100. Especially, when a user interaction of the input device 200 touching the display 110 is sensed through the sensor 120, the controller 130 may control the functions of the user terminal device according to the touch pattern on the touched surface among the plurality of surfaces. Herein, each of the plurality of surfaces of the input device 200 may have a corresponding function and include a shape representing the corresponding function.

More specifically, when a user interaction is sensed of the display 110 being touched by the input device 200 through the sensor 120, the controller 130 may sense a touch pattern on the touched surface of the input device, and determine the touched surface based on the sensed touch pattern, and perform a function corresponding to the determined touched surface.

In an embodiment of the present disclosure, when a user interaction of a touch by the input device 200 is sensed, the controller 130 may control the display 110 to display on an area surrounding the touched area by the input device 200 a UI that includes a plurality of menus to control the user terminal device according to the touch pattern of the touched surface of the plurality of surfaces. For example, when a user interaction of a first surface of the input device 200 touching the display 110 is sensed, the controller 130 may determine the first surface touched based on the touch pattern of the first surface and control the display 110 to display a UI that includes various menus such as a home menu, edit menu, and search menu and the like such that it corresponds to the first surface.

Furthermore, when an interaction is sensed of the input device 200 being dragged to one of the plurality of menus with the input device 200 still touching the display, the controller 130 may perform a function that corresponds to the menu to which the input device 200 has been dragged. For example, when an interaction is sensed of the input device 200 being dragged to the search menu of the plurality of menus with the input device 200 still touching the display, the controller 130 may control the display 110 to display a search window to perform the search function.

Furthermore, when an interaction is sensed of the display being touched by to first surface of the plurality of surfaces of the input device 200 and then being dragged to a second point, the controller 130 may control the display 110 to create a new screen on an area where the interaction was input. Herein, the controller 130 may generate a new type of screen according to the touch pattern of the first surface that touched the display.

Furthermore, when an interaction is sensed of the input device 200 being turned around such that the surface touching the display is changed from the first surface to the second surface, the controller 130 may perform a function corresponding to the interaction. For example, the controller 130 may perform a function of moving an item according to the interaction of the input device 200 being turned over.

Furthermore, after an interaction is sensed of the input device 200 being turned around such that the surface touching the display is changed from the first surface to the second surface with at least one item being displayed on the display 110 and then a tap interaction of a first item of the at least one item being tapped by the second surface of the input device tapping, the controller 130 may store data corresponding to the first item where the tap interaction was sensed.

Furthermore, when an interaction is sensed of the input device 200 being rotated with the first surface of the input device 200 still touching the first item of the at least one item being displayed, the controller may perform a function corresponding to the first surface on the first item. For example, when an interaction is sensed of the input device 200 being rotated with the first surface of the input device 200 still touching the first item, the controller 130 may perform a locking function on the first item.

According to the aforementioned various embodiments of the present disclosure, the user terminal device 100 may not only perform various manipulations through an input device having a polyhedral shape but also provide a new interaction with various fun elements added thereto.

Hereinafter, the present disclosure will be explained in further detail with reference to FIGS. 3 to 15B.

Figure 3:
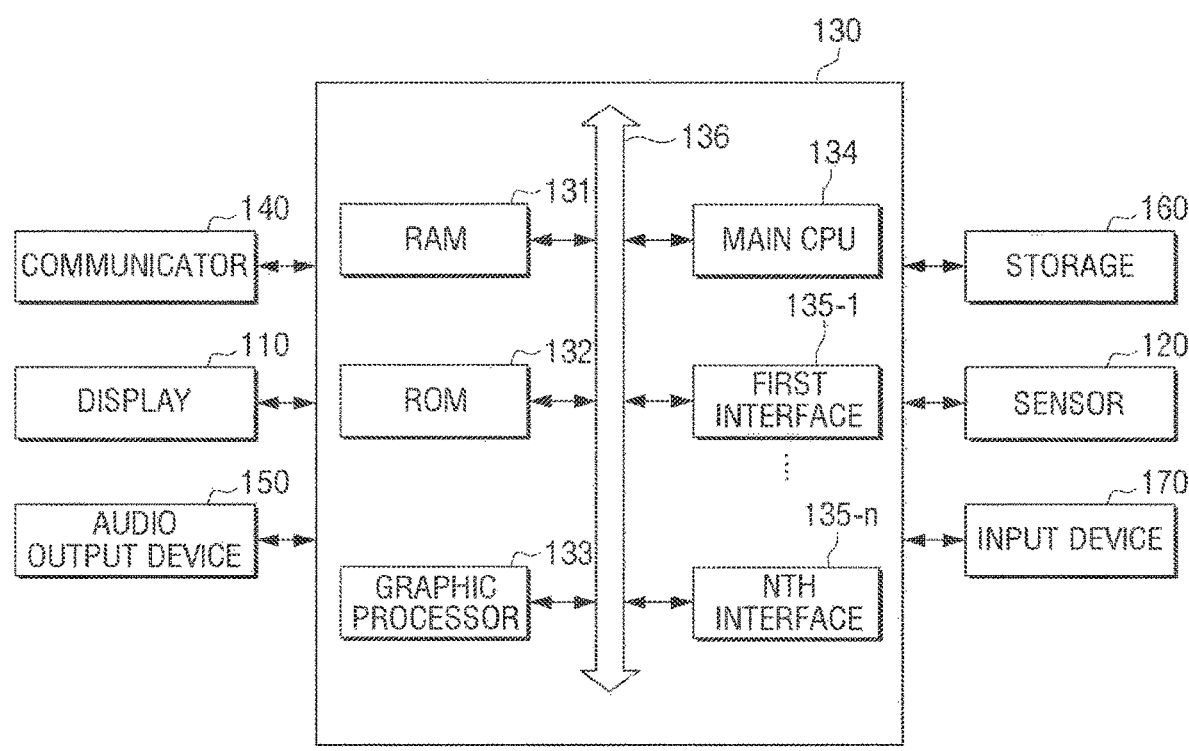
FIG. 3 is a block diagram illustrating in detail a configuration of a user terminal device according to an embodiment of the present disclosure.

FIG. 3 is a block diagram illustrating in detail a configuration of the user terminal device 100 according to an embodiment of the present disclosure. The user terminal device 100 includes a communicator 140, display 110, audio output device 150, storage 160, sensor 120, input device 170 and controller 130.

Referring to FIG. 3, a comprehensive illustration of various components of a user terminal device that includes various functions such as a communication function and display function for example. Therefore, in an embodiment, some of the illustrated components may be changed or other components may be further added.

The communicator 140 is a configuration for performing various types of external devices or external servers according to various types of communication methods. The communicator 140 may include various communication chips such as a WiFi chip, Bluetooth chip, NFC chip, and wireless communication chip and the like. Herein, each of the WiFi chip, Bluetooth chip, and near field communication (NFC) chip performs communication in the WiFi method, Bluetooth method, and NFC method, respectively. Of these chips, the NFC chip is a chip that operates in an NFC method that uses the 13.56 MHz bandwidth, among numerous RF-ID frequency bandwidths of 135 kHz, 13.56 MHz, 433 MHz, 860-960 MHz, and 2.45 GHz. When using a WiFi chip or Bluetooth chip, it is possible to transceive various information on connection such as information on an SSID and session key first, make a communication connection using those information to transceive various information. A wireless communication chip refers to a chip that performs communication according to various communication standards such as IEEE, zigbee, $3^{rd}$ Generation, 3rd generation partnership project (3GPP), and long term evolution (LTE).

Especially, when a user interaction is sensed in which the input device 200 including a different touch pattern in each of the plurality of surfaces has touched the display, the communicator 140 may establish a communication connection with another user terminal device 100 that sensed the same touch pattern as the touch pattern on the touched surface of the input device.

The display 110 displays at least one of a video frame consisting of image data received from an image receiver (not illustrated) processed by an image processor (not illustrated) and various screens generated in a graphic processor 133. Especially, the display 110 may display on the area surrounding the touched area a UI that includes at least one menu that may control the user terminal device 100.

The audio output device 150 is a component for outputting various audio data processed in the audio processor (not illustrated), various alarm sounds, and voice messages.

The storage 160 stores various modules for driving the user terminal device 100. For example, a software including a base module, sensing module, communication module, presentation module, web browser module, and service module may be stored in the storage 160. Herein, the base module is a basic module that processes a signal transmitted from each hardware included in the user terminal device 100 and transmits the processed signal to an upper layer module. A sensing module is a module that collects information from various sensors, and that analyzes and manages the collected information. Examples of sensing modules include a face recognition module, voice recognition module, motion recognition module, and NFC recognition module. The presentation module is a module used to configure a display screen. Examples of presentation modules include a multimedia module for reproducing and outputting multimedia contents, and UI rendering module for processing a UI and graphics. The communication module is a module used for communicating with an external device. The web browser module is a module for web browsing and accessing a web server. The service module is a module that includes various applications for providing various services.

Especially, the storage 160 may store information on the touch patterns included in each of the plurality of surfaces of the input device 200, and also information on the functions and UI corresponding to each of the plurality of surfaces.

The sensor 120 senses a user interaction on the display 110. Especially, the sensor 120 may sense various user interactions such as a touch interaction, drag interaction, rotation interaction, turn over interaction and the like made on the display 110. Meanwhile, the sensor 120 may be configured as a touch screen just as the display 110, or one of various types of sensing devices such as a proximity sensor, camera and the like.

The input device 170 receives user commands for controlling overall operations of the user terminal device 100. Especially, the input 170 may be configured as a button and the like, but without limitation, and thus the input device 170 may be configured as another type of input device such as a remote control, pointing device and the like that may control the user terminal device 100.

The controller 130 controls the overall operation of the terminal device 100 using various programs stored in the storage 160.

As illustrated in FIG. 3, the controller 130 includes a RAM 131, ROM 132, graphic processor 133, main CPU 134, $1^{st}$ to $n^{th}$ interfaces 135-1 to 135-n, and bus 136. Herein, the RAM 131, ROM 132, graphic processor 133, main CPU 134, and $1^{st}$ to $n^{th}$ interfaces 135-1 to 135-n may be connected to one another via buses 136.

The ROM 132 stores sets of commands for system booting. When a turn on command is input and power is supplied, the main CPU 134 copies an O/S stored in the storage 160 to the RAM 131 according to the command stored in the ROM 132, and executes the O/S to boot the system. When the booting is completed, the main CPU 134 copies various application programs stored in the storage 160 to the RAM 131, and executes the application programs copied to the RAM 131 to execute various operations.

The graphic processor 133 generates a screen that includes various objects such as icons, images and texts using an operator (not illustrated) and renderer (not illustrated). The operator computes attribute values such as coordinates, shapes, sizes, and colors and the like of each object to be displayed according to layouts of the screen using control commands received from the sensor 120 or input device 170.

The renderer generates screens of various layouts that include objects based on attribute values computed in the operator. The screen generated in the renderer is displayed within the display area of the display 110.

The main CPU 134 accesses the storage 160, and performs booting using the O/S stored in the storage 160. Furthermore, the main CPU 134 performs various operations using various programs, contents, and data and the like stored in the storage 160.

The $1^{st}$ to $n^{th}$ interfaces 135-1 to 135-n are connected to the aforementioned various components. One of the interfaces may be a network interface connected to an external device via a network.

Especially, when a user interaction of the display 110 being touched by the input device 200 having a polyhedral shape is sensed through the sensor 120, the controller 130 may control the functions of the user terminal device 100 according to a touch pattern on the touched surface among the plurality of surfaces of the input device.

Figure 4A:
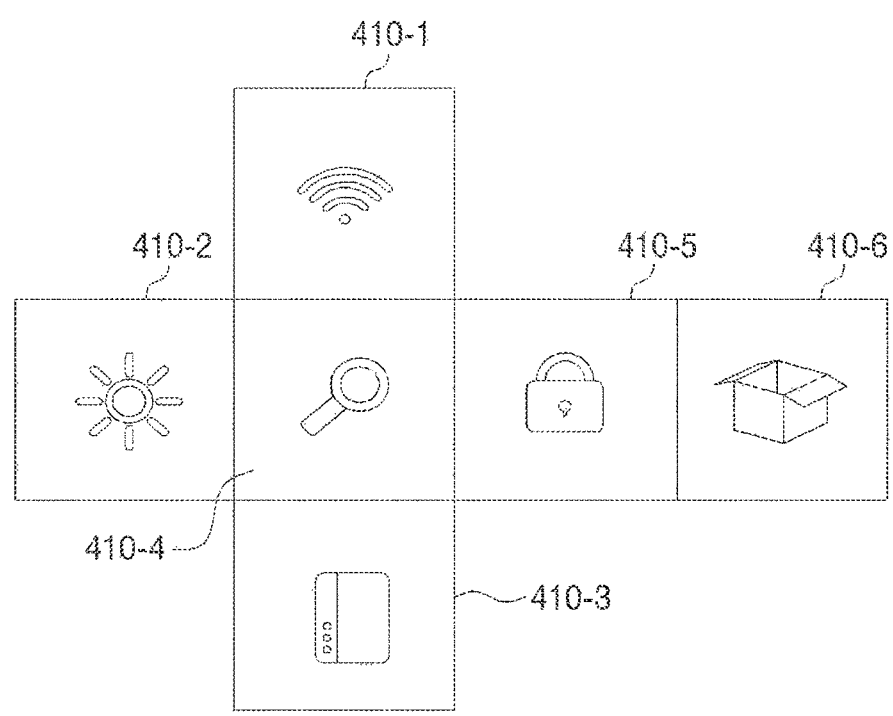
FIGS. 4A, 4B, 4C and 4D are views for explaining an hexahedral input device according to an embodiment of the present disclosure.

According to an embodiment of the present disclosure, the input device 200 having a polyhedral shape may be one having a regular hexahedral shape. Each of the plurality of surfaces of the input device 200 has its corresponding functions of the user terminal device 100, and each of the plurality of surfaces of the input device 200 may include a shape representing its functions of the user terminal device 100. For example, as illustrated in FIG. 4A, a first surface of the input device 200 includes a shape representing a wireless communicating function 410-1, a second surface of the input device 200 includes a shape representing a brightness adjustment function 410-2, a third surface of the input device 200 includes a shape representing a schedule management function 410-3, and a fourth surface of the input device 200 includes a shape representing a search function 410-4, a fifth surface of the input device 200 includes a shape representing a lock function 410-5, and a sixth surface of the input device 200 may include a shape representing a data storing function 410-6. Meanwhile, besides the aforementioned, there may be other kinds of various functions (for example deleting function and magnet function and the like) that may correspond to each of the plurality of surfaces of the input device 200.

Furthermore, each of the plurality of surfaces of the input device 200 includes an electrode with different touch patterns.

Figure 4B:
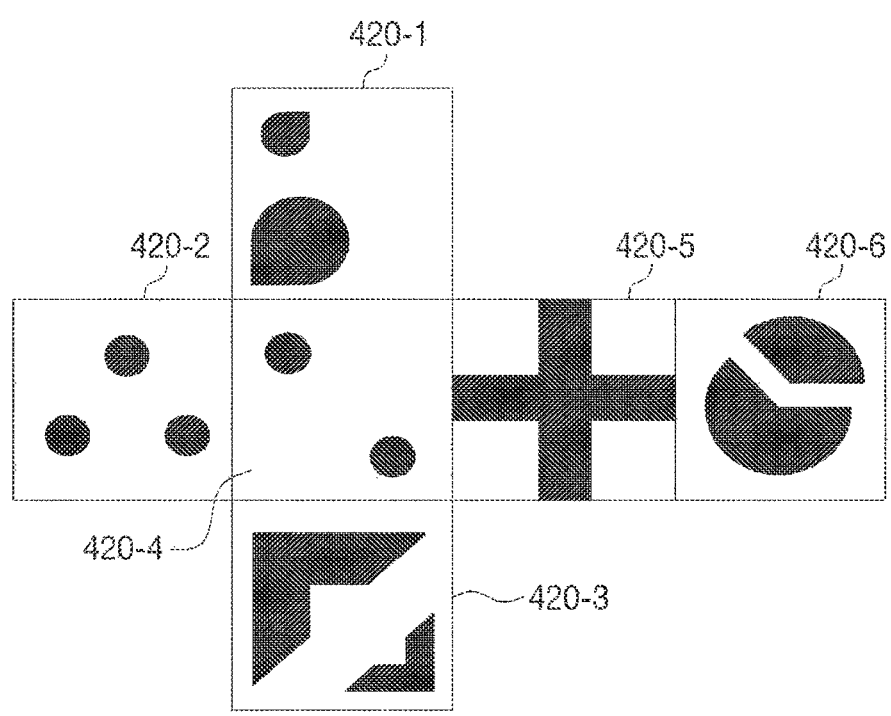
Figure 4C:
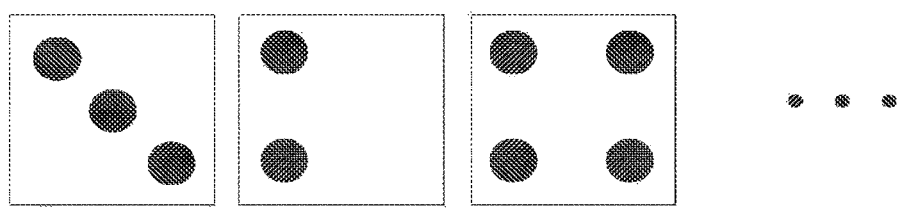
Figure 4D:
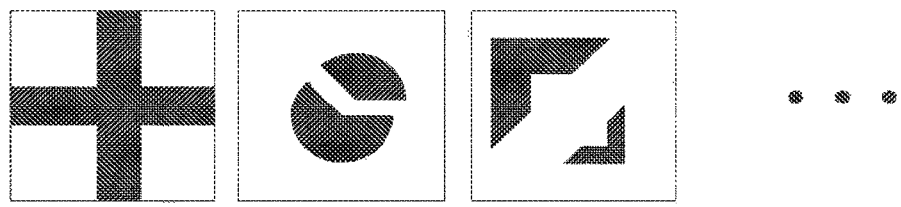

Specifically, as illustrated in FIG. 4B, the plurality of surfaces of the input device 200 include electrodes 420-1 to 420-6 of different counts and shapes. Herein, the locations and counts of the electrodes may be different from one another as illustrated in FIG. 4C, and the shapes of the electrodes may be different from one another as illustrated in FIG. 4D.

Meanwhile, according to an embodiment of the present disclosure, a touch pattern formed on one surface and a shape representing its function may correspond to each other. That is, a touch pattern 420-1 of the first surface may correspond to a shape of the first surface 410-1, a touch pattern 420-3 of the third surface may correspond to a shape of the third surface 410-2, a touch pattern 420-4 of the fourth surface 410-4 may correspond to a shape of the fourth surface 410-4, a touch pattern 420-5 of the fifth surface may correspond to the fifth surface 410-5, and a touch pattern 420-6 of the sixth surface may correspond to a shape 410-6 of the sixth surface.

However, this is a mere embodiment of the present disclosure, and thus a touch pattern of a surface may correspond to a shape of the surface on the opposite side so that the function that the user intends to execute can be seen. More specifically, in a case where the user performs a touch interaction using the input device 200, not the touched surface but the opposite surface may be shown to the user. Therefore, a touch pattern may correspond to the shape on the opposite side so that the user may see the function of the touched surface more intuitively. Therefore, a touch pattern 420-1 of the first surface may correspond to a shape 410-3 of the third surface, a touch pattern 420-2 of the second surface may correspond to a shape of the fifth surface 410-5, a touch pattern of the third surface may correspond to a shape 410-1 of the first surface, a touch pattern 420-4 of the fourth surface may correspond to the shape of the sixth surface 410-6, a touch pattern 420-5 of the fifth surface may correspond to the shape of the second surface 410-2, and a touch pattern of the sixth surface may correspond to a shape of the fourth surface 410-4. In such a case, the shape included in the opposite surface of the touched surface is shown to the user, thereby enabling the user to see the functions corresponding to the touched surface more easily.

In the aforementioned embodiments of the present disclosure, it was explained that the input device 200 includes an electrode of a predetermined touch pattern, and that the sensor 120 is a capacitive touch panel, but this is not limitation thereto, and thus the sensor 120 may be a decompression type touch panel, wherein the input device 200 may be provided with a touch pattern on each of the plurality of surfaces so that pressure can be applied to the predetermined touch pattern.

Referring to FIGS. 5A to 15B, explanation will be made on various functions that may be performed according to a sensed user interaction using the input device 200.

In an embodiment of the present disclosure, when an interaction of a first surface among the plurality of surfaces of the input device 200 touching a first point on the display 110 and dragging the touch to a second point is sensed, the controller 130 may control the display 110 to generate a new screen on the area where the interaction was sensed.

Figure 5A:
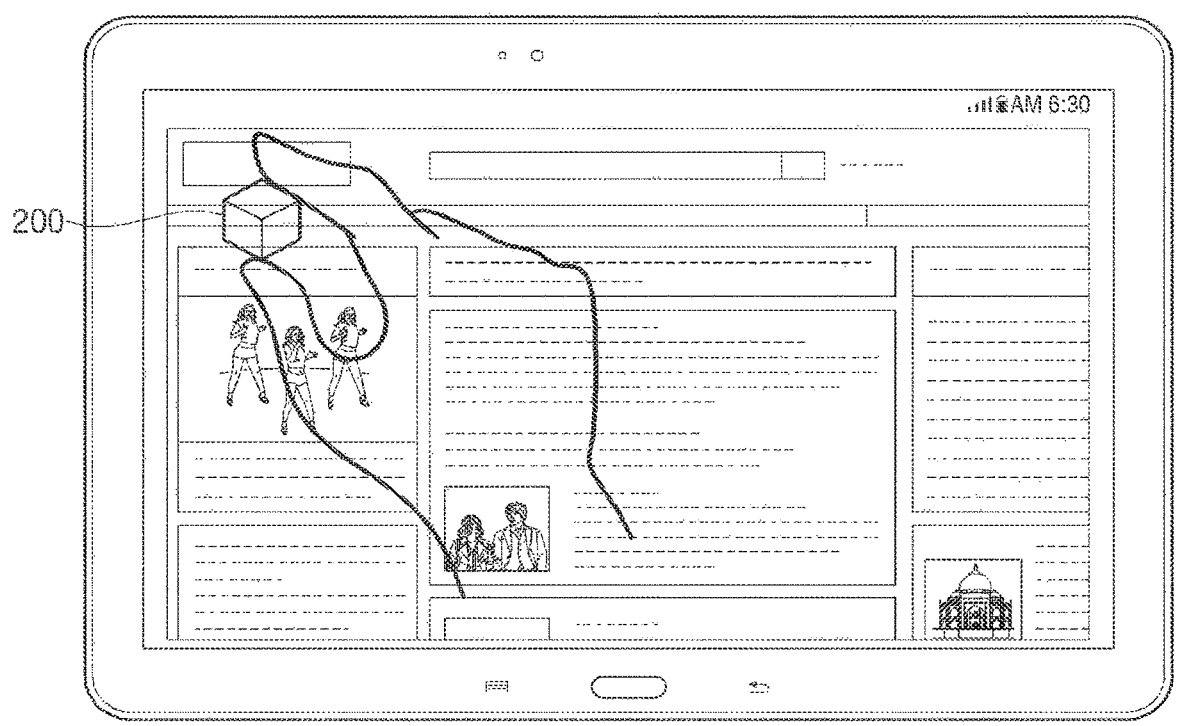
FIGS. 5A to 15B are views for explaining various embodiments of controlling a user terminal device using a hexahedral input device according to various embodiments of the present disclosure.
Figure 5B:
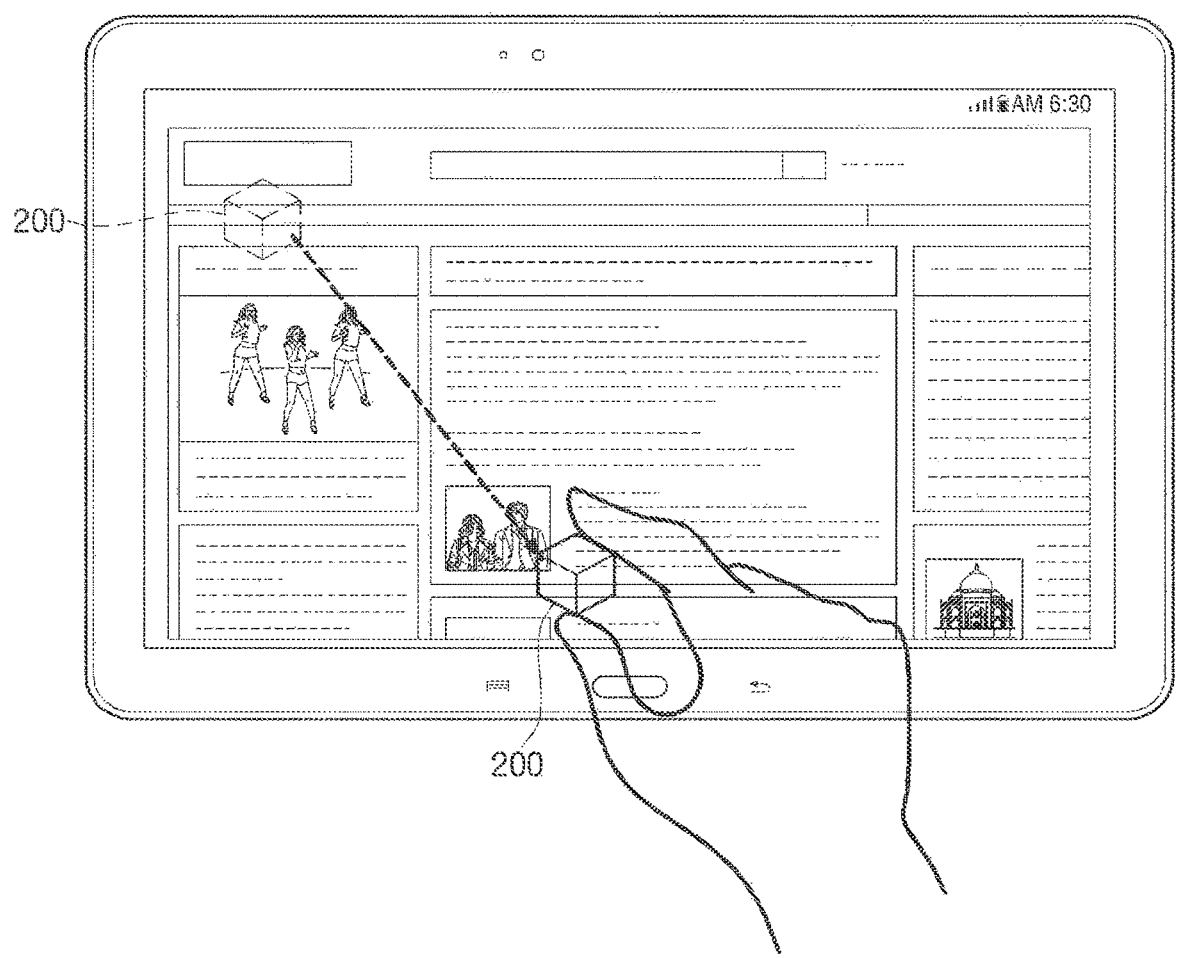
Figure 5C:
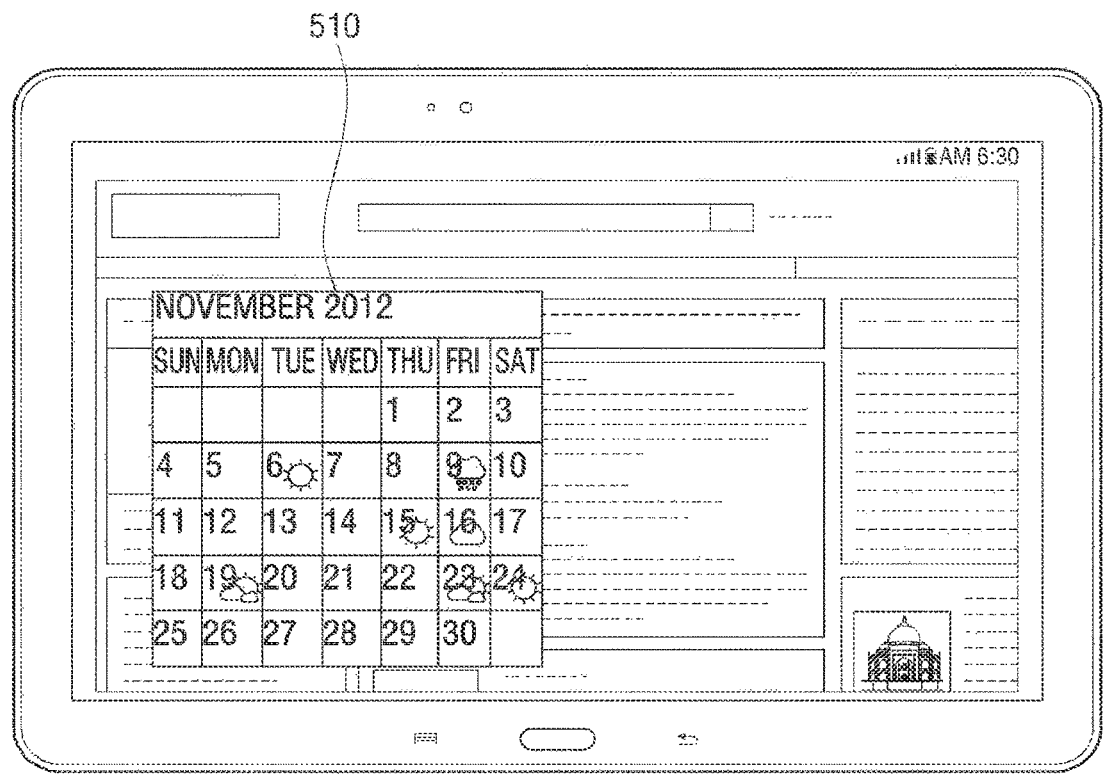

Referring to FIG. 5A, when an interaction is sensed in which the first point of the display 110 is touched by the first surface of the input device 200 and then dragged to the second point of the display 110 as illustrated in FIG. 5B, the controller 130 may, as illustrated in FIG. 5C, control the display 110 to display a new window. Herein, the new window may have a shape of a square where the first point and second point face each other as illustrated in FIG. 5C.

Especially, the controller 130 may control the display 110 to generate a new screen 510 of a different type according to the touch pattern of the touched first surface. For example, when the first surface is a surface that corresponds to the schedule managing function, the controller 130 may, as illustrated in FIG. 5C, control the display 110 to display a screen on the new screen for schedule managing. In another embodiment of the present disclosure, in a case where the first surface corresponds to the search function, the controller 130 may control the display 110 to display a screen for search on a new screen.

Furthermore, when an interaction of the display 110 being touched by the input device 200 is sensed, the controller 130 may control the display 110 to display a UI that includes a plurality of menus for controlling the user terminal device 100 to display a UI including a plurality of menus near the touched area of the display 110 according to the touch pattern of the touched surface of the plurality of surfaces of the input device. Furthermore, when a user interaction of the input device being dragged to one of the plurality of menus with the input device still touching the display is sensed, the controller 130 may perform a function corresponding to the menu to which the input device was dragged.

Figure 6A:
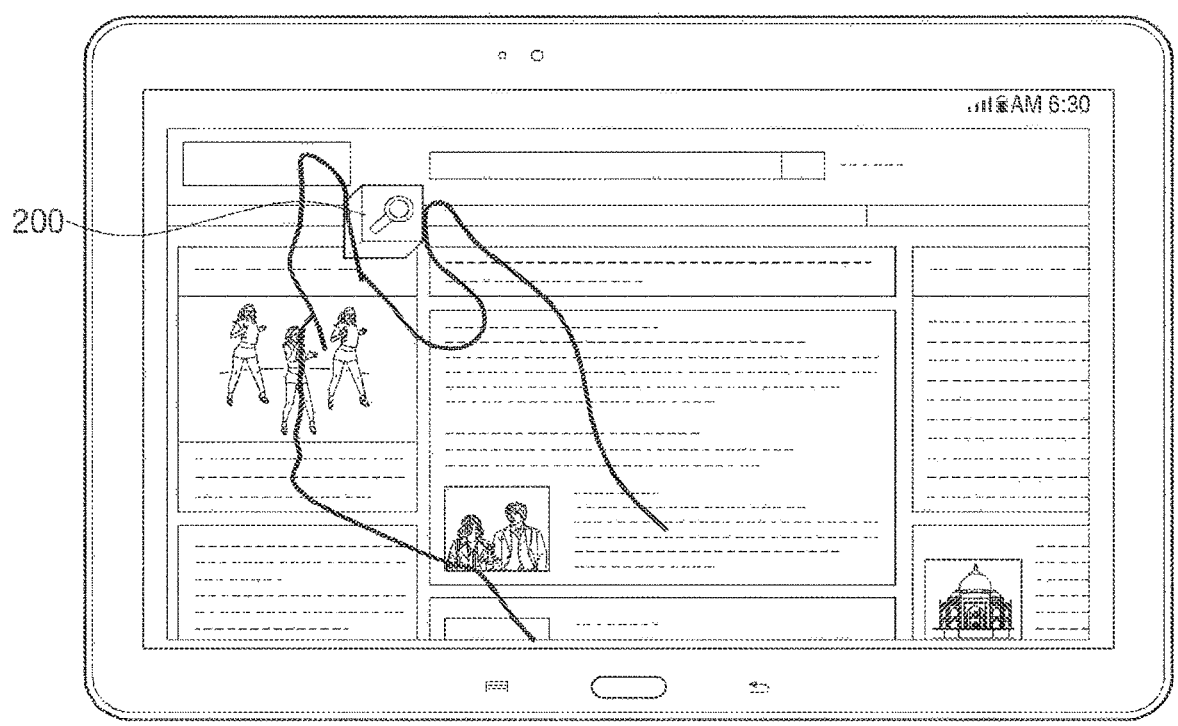
Figure 6B:
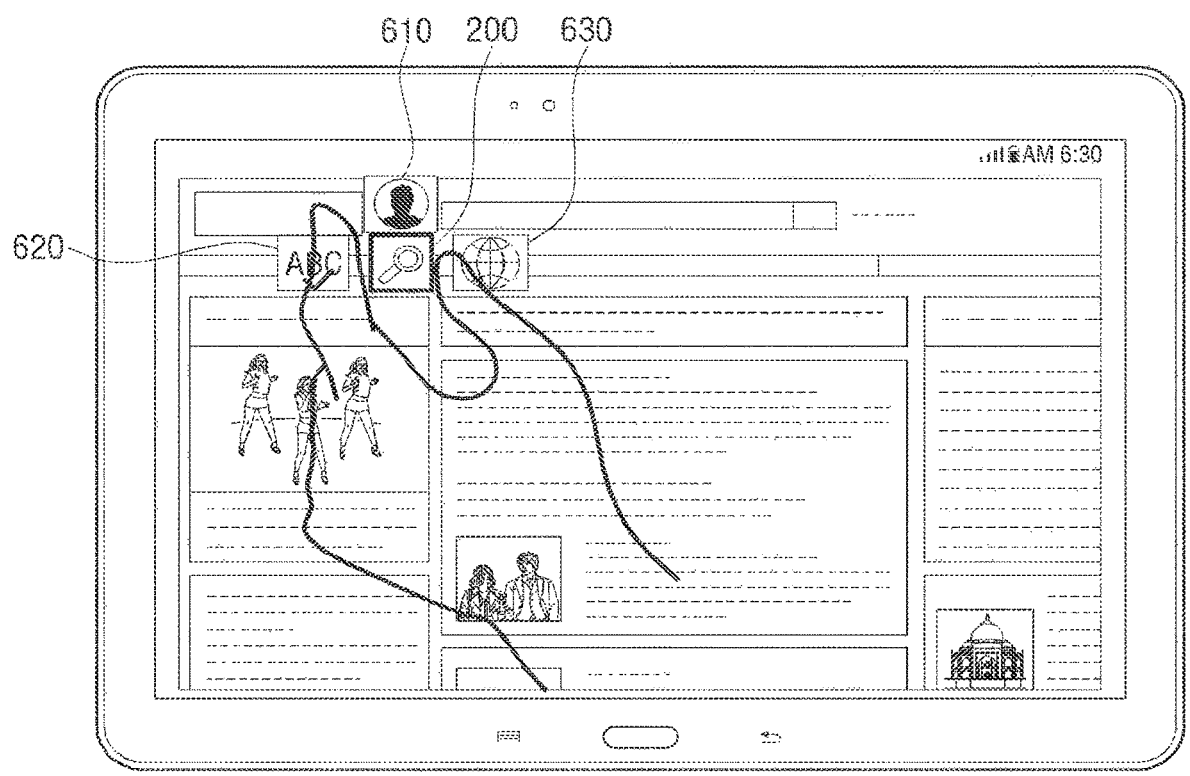

Referring to FIG. 6A, when a user interaction of the display 110 being touched by a first surface of the input device 200 is sensed, the controller 130, as illustrated in FIG. 6B, may control the display 110 to display a UI including a plurality of menus 610 to 630 capable of performing a function corresponding to the first surface near the touched area on the display 110. For example, when a user interaction of the display being touched by surface corresponding to the search function is sensed, the controller may as illustrated in FIG. 6B, control the display 110 to display a human search menu 610, dictionary menu 620 for searching word information, and internet search menu 630 capable of searching related information from the internet on the surrounding area of the touched surface on the display.

Figure 6C:
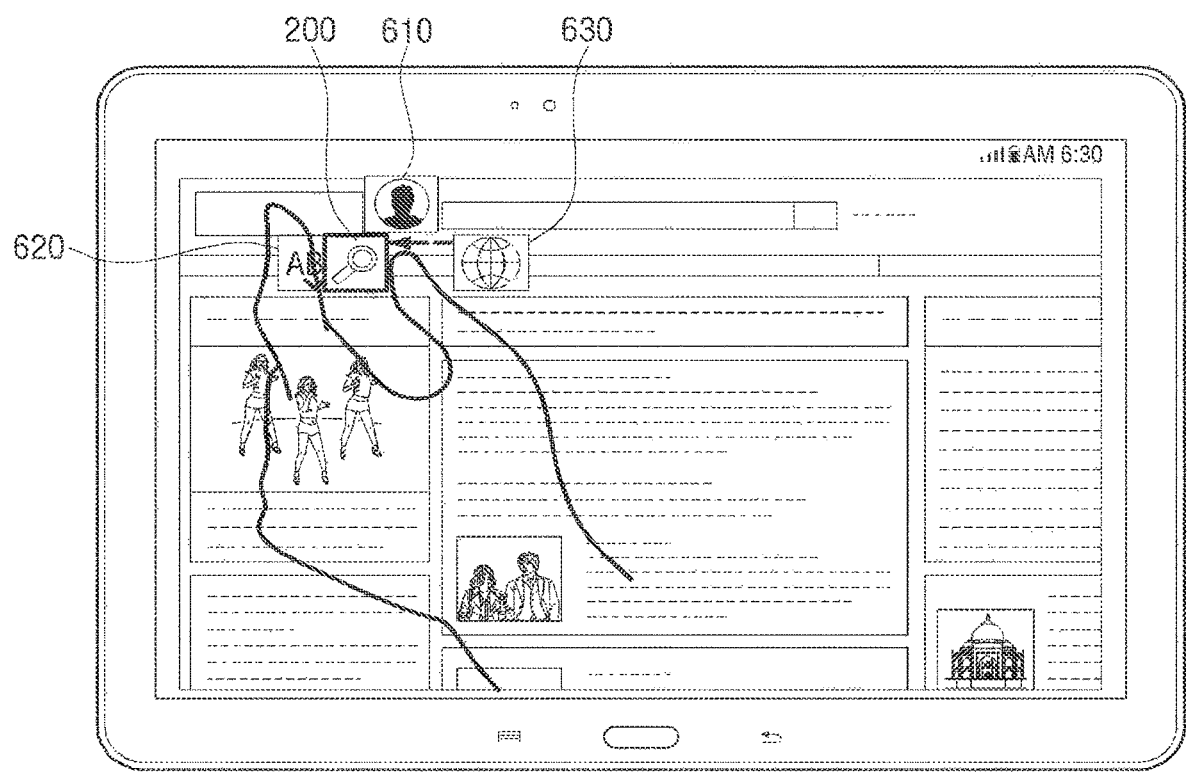
Figure 6D:
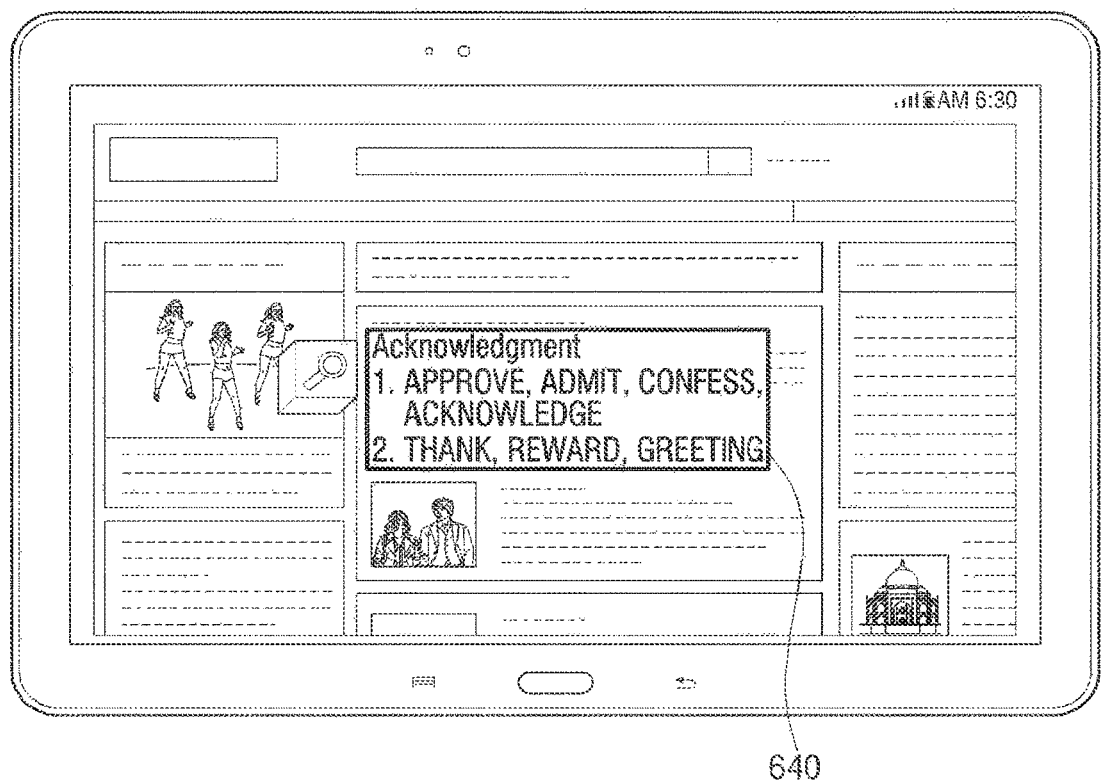

Referring to FIG. 6C, when a user interaction of the input device 200 being dragged to the dictionary menu 620 of the plurality of menus with the input device still touching the display is sensed, the controller 130 may perform a function corresponding to the dictionary menu 620. More specifically, when a user command to select a certain word while the function of searching word information corresponding to the dictionary menu 620 is being activated, the controller may, as illustrated in FIG. 6D, control the display 110 to display the dictionary information 640 on the certain word selected.

According to another embodiment of the present disclosure, when a user interaction is sensed of the input device being rotated while still maintaining a touch by the first surface of the input device on a first item among at least one items displayed on the display 110, the controller 130 may perform the function corresponding to the first surface regarding the first item.

Figure 7A:
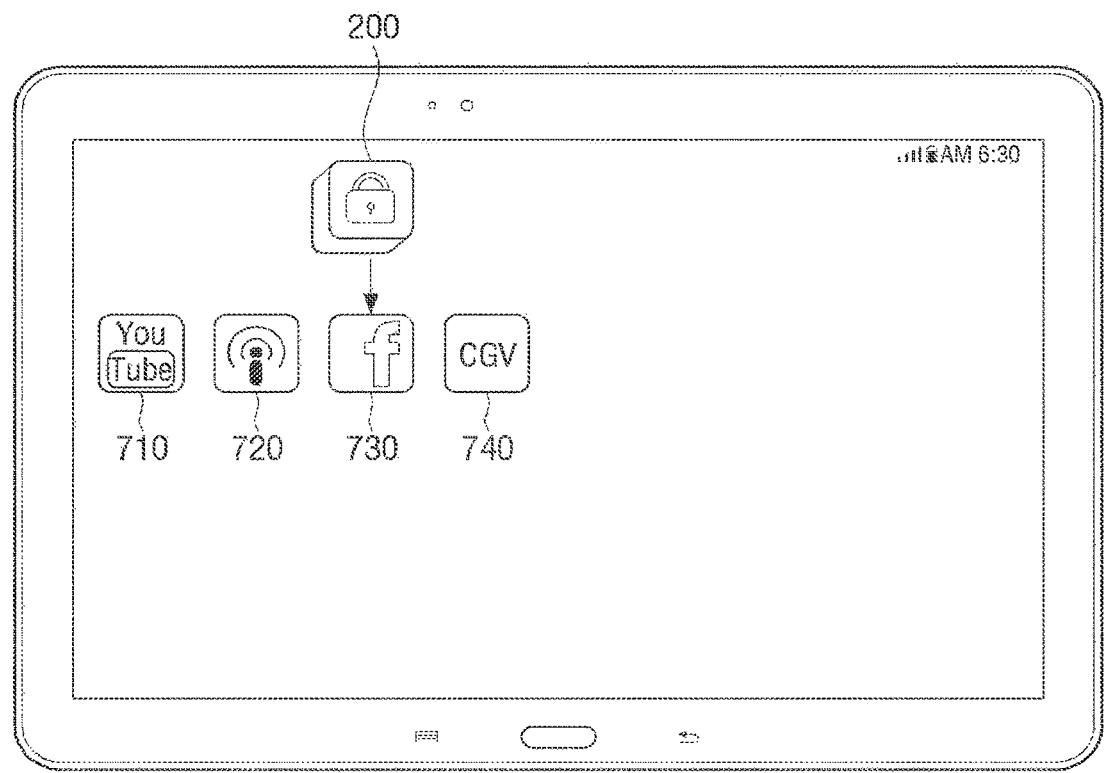
Figure 7B:
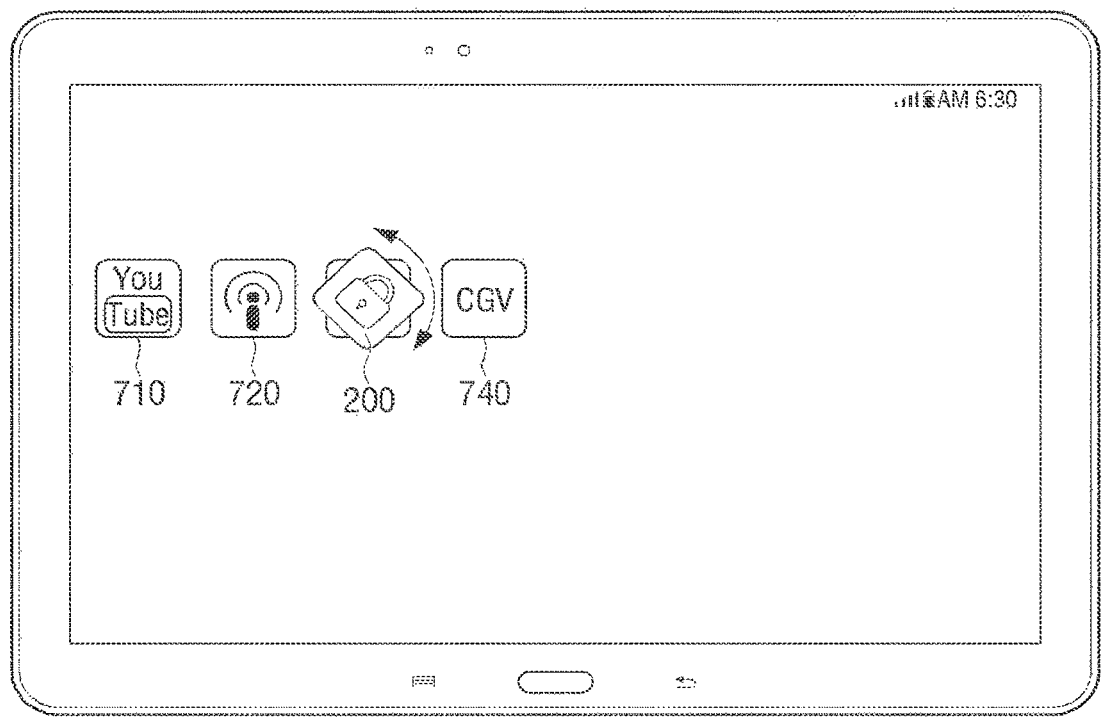

Referring to FIG. 7A, when a user interaction is sensed of the third item 720 on the display being touched by the first surface (corresponding to the lock function) of the input device while a plurality of items 710 to 740 are being displayed on the display 110, and then the input device being rotated while maintaining the touch by the first surface as illustrated in FIG. 7B, the controller 130 may perform the lock function regarding the third item 730. In another example, a user interaction is sensed of the input device 200 being rotated while still maintaining the touch by the first surface of the input device According to another embodiment of the present disclosure, when a user interaction is sensed of the second item 720 being touched by the second surface (corresponding to the delete function) of the input device while the plurality of items 710 to 740 are being displayed on the display 110 and the input device 200 being rotated while maintaining the touch by the first surface, the controller 130 may delete the second item 720.

According to another embodiment of the present disclosure, when a user interaction is sensed of the input device 200 being turned around such that the surface touching the display is changed from the first surface to the second surface, the controller 130 may perform the function corresponding to the interaction of the input device 200 being turned around.

Figure 8A:
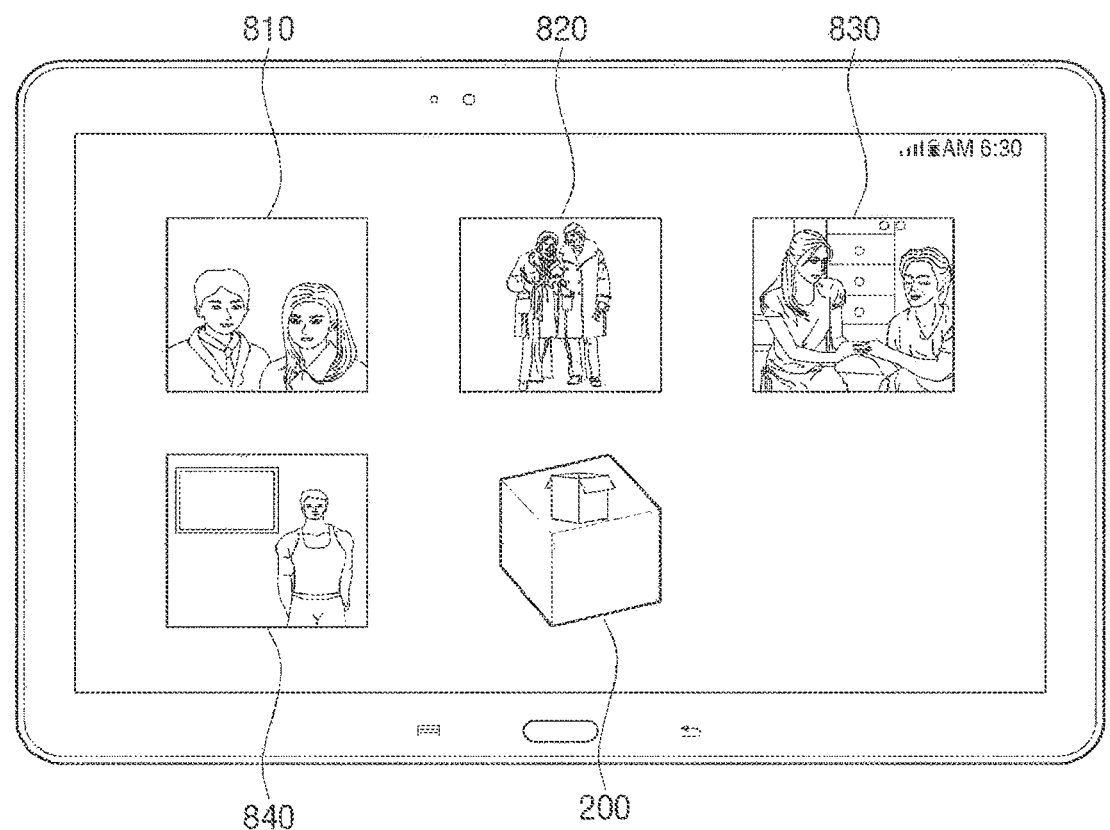
Figure 8B:
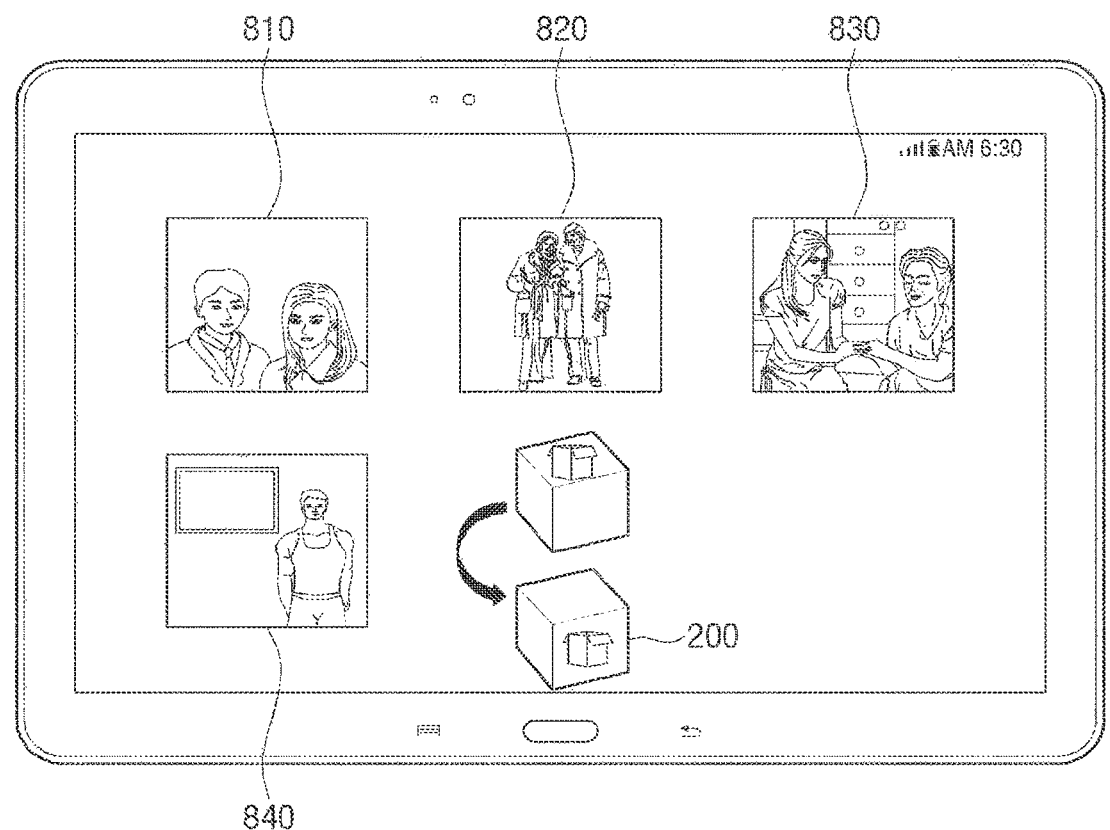

Referring to FIG. 8A, when a user interaction is sensed of the input device 200 being turned around such that the surface touching the display is changed from the first surface (corresponding to the data storing function) to the second surface as illustrated in FIG. 8B with the plurality of items 810 to 840 that correspond to a plurality of photo items being displayed on the display 110, the controller 130 may activate the data storage function that corresponds to the interaction of the input device 200 being turned around.

Figure 8C:
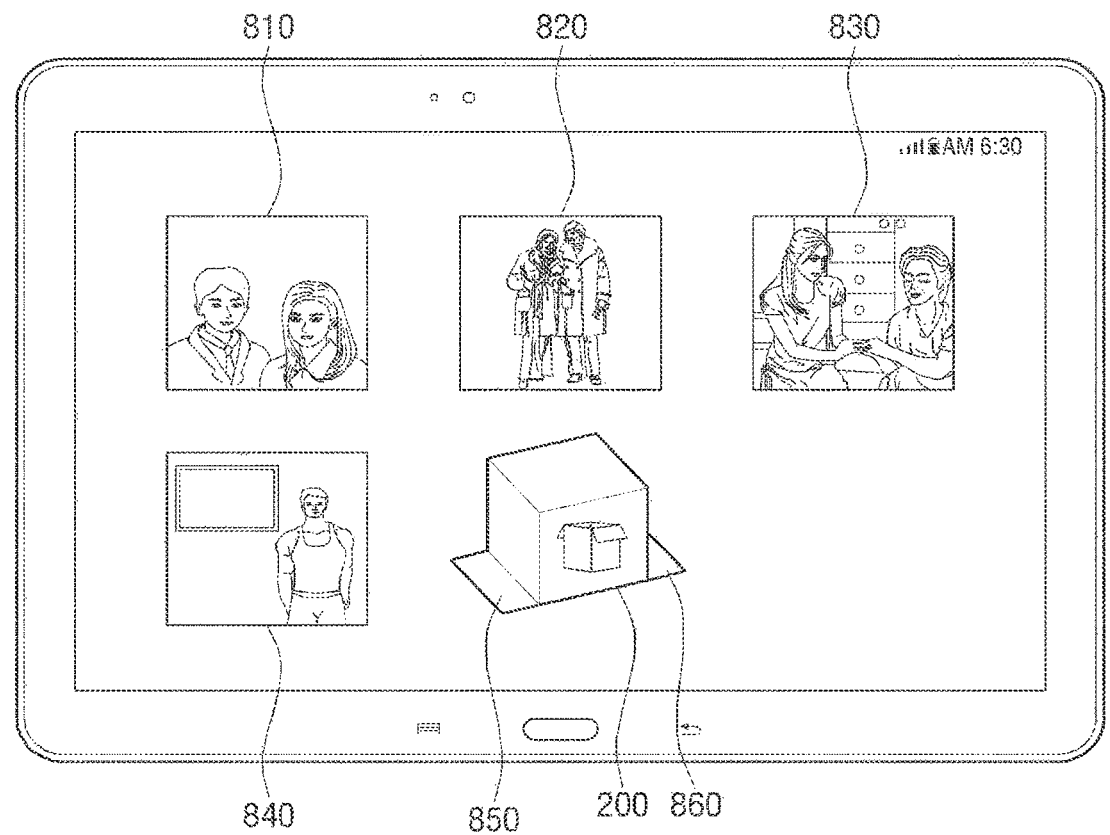
Figure 8D:
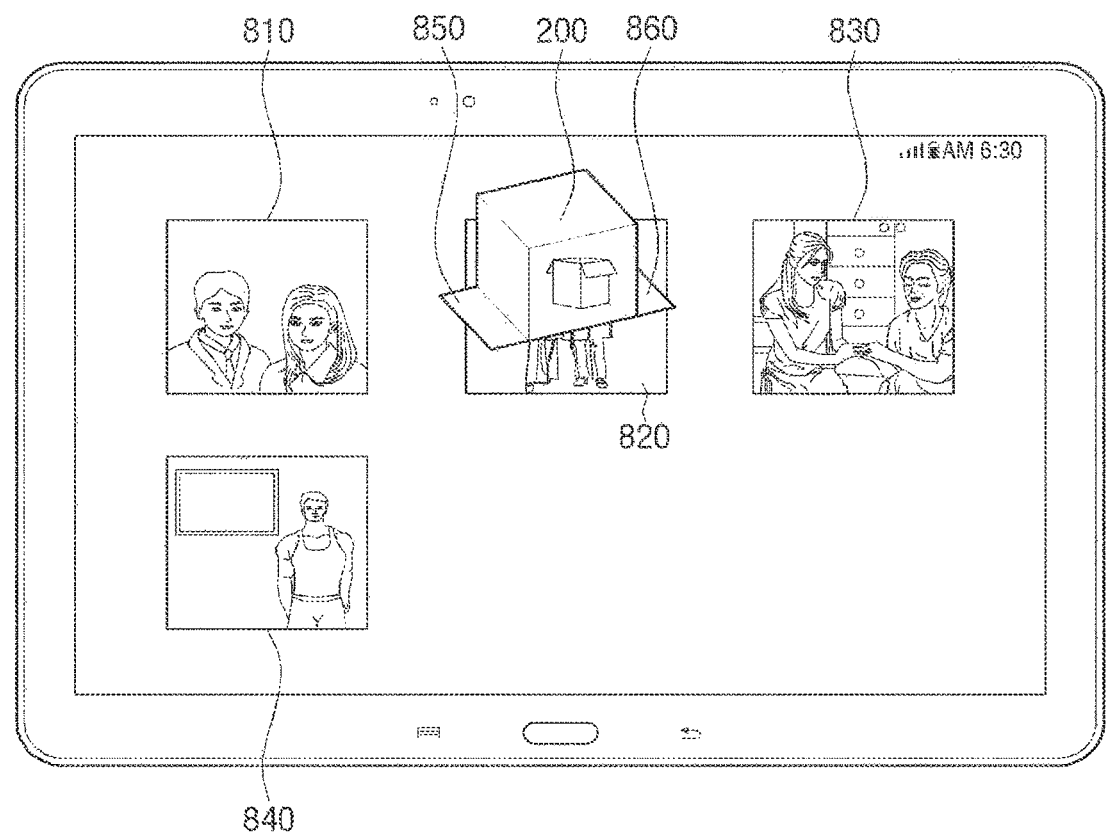

Herein, the controller may, as illustrated in FIG. 8C, control the display 110 to display a GUI 850, 860 as if a box is being opened on the area surrounding the touched area.

Figure 8E:
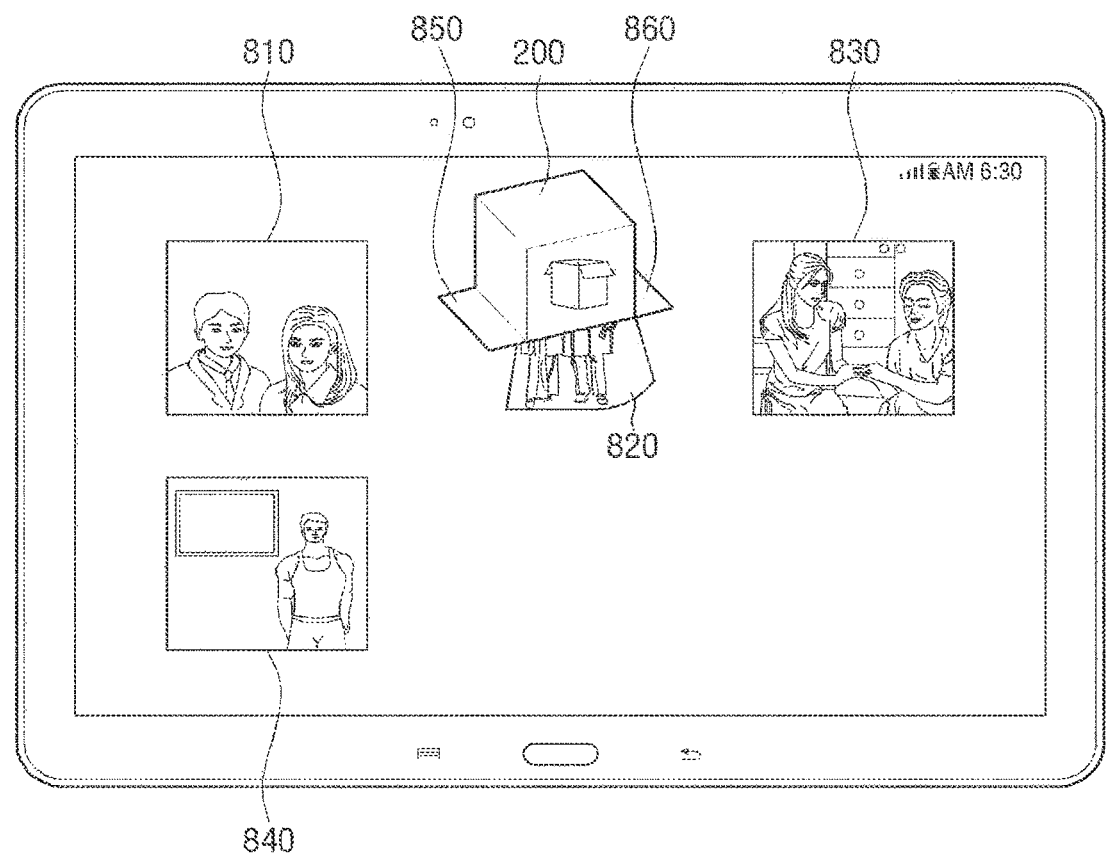

Furthermore, when a tap interaction of the second item 820 among the plurality of items being touched by the second surface is sensed, the controller 130 may store the photo content corresponding to the second item 820 where the tap interaction was sensed in the storage 160. Herein, when the photo content corresponding to the second item 820 is stored in the storage 160, the controller 130 may, as illustrated in FIG. 8E, control the display 110 to display a GUI as if the second item 820 is being absorbed into the box. Then, when a tap interaction of the third item 830 being tapped by the second surface of the input device 200 is sensed, the controller 130 may control the display 110 to display a GUI as if the photo content corresponding to the third item 830 where the tap interaction was sensed is being stored in the storage 160, and the third item 830 is being absorbed into the box. Furthermore, when the display 110 is touched by a surface other than the second surface of the input device 200, the controller 130 may stop the data storing function.

Figure 9:
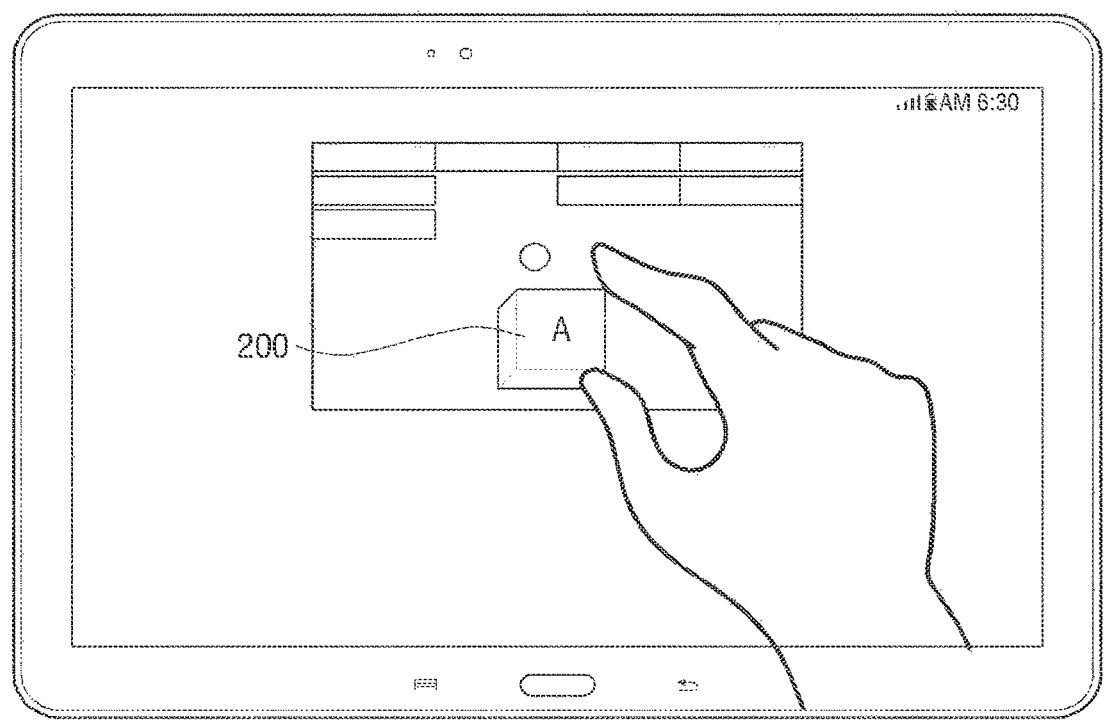
Figure 10:
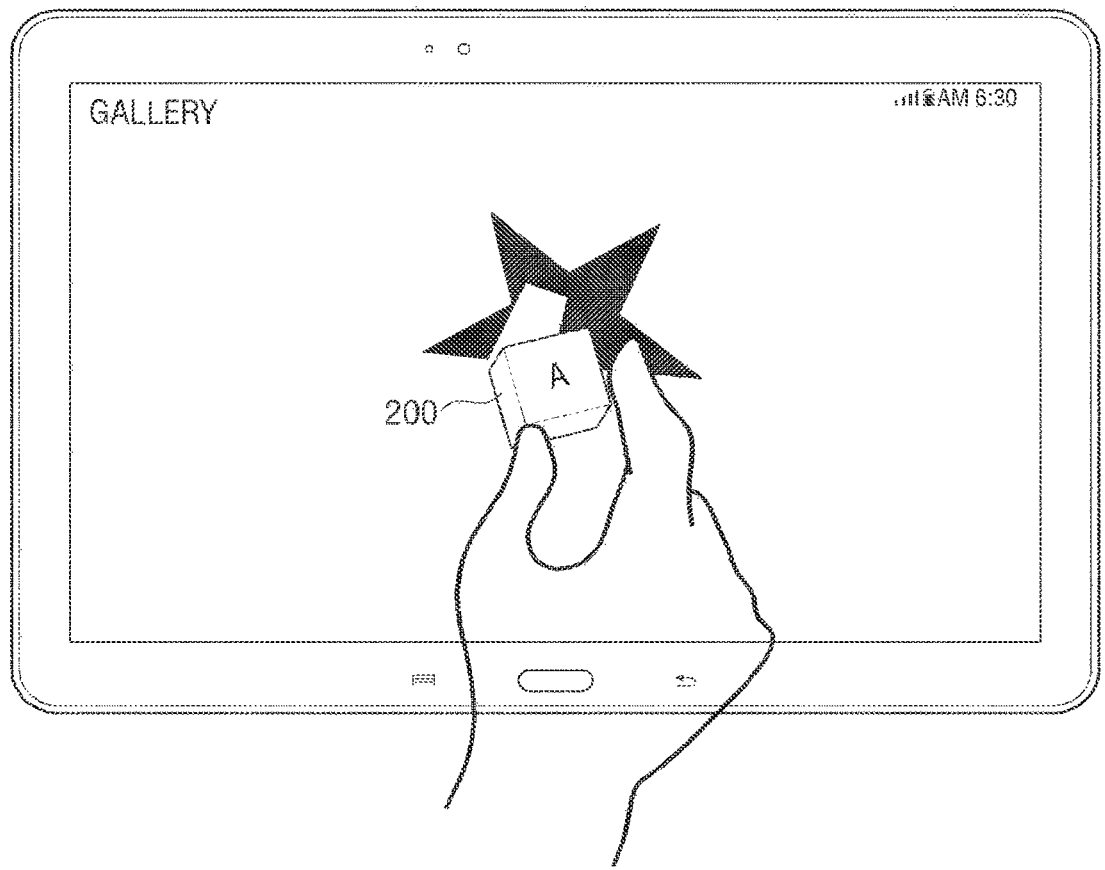

According to another embodiment of the present disclosure, the controller 130 may perform various functions using the input device 200 while a certain application is being executed. For example, the controller 130 may perform a controller function for performing a game application as illustrated in FIG. 9 using the input device 200 while the game application is being executed. More specifically, while a game application of breaking walls with a ball is being executed, when a ball hits the area touched by the input device 200, the controller 130 may perform a function of rebounding the hit ball.

By another example, while a drawing application is being executed, the controller 130 may perform an eraser function of erasing a picture drawn using the input device 200. More specifically, by touching the display with the first surface of the input device 200 and then dragging the touch, the controller 130 may perform the erasing function.

Figure 11A:
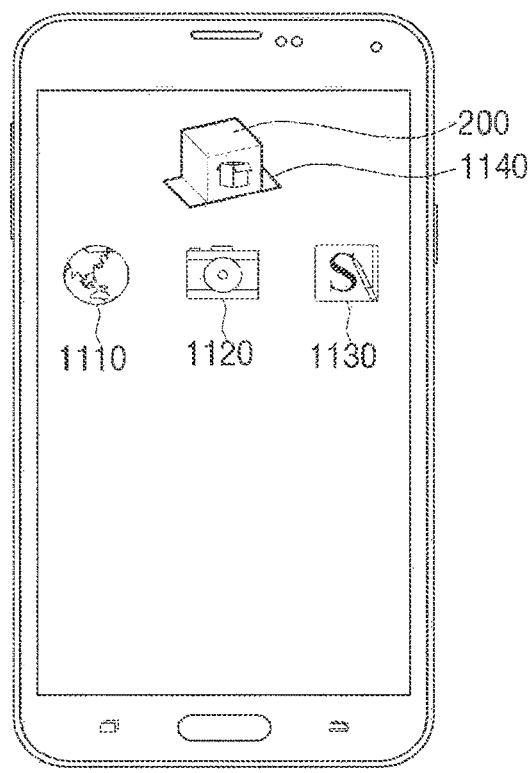

According to another embodiment of the present disclosure, the controller 130 may control the communicator 140 to transmit various items to another user terminal device using the input device 200. More specifically, when a user interaction is sensed of an area of the display 110 being touched by a surface corresponding to the data storing function of the input device 200 while a plurality of items 1110 to 1130 are being displayed, the controller 130 may, as illustrated in FIG. 11A, control the display 110 to display a GUI 1140 as if a box is being opened.

Figure 11B:
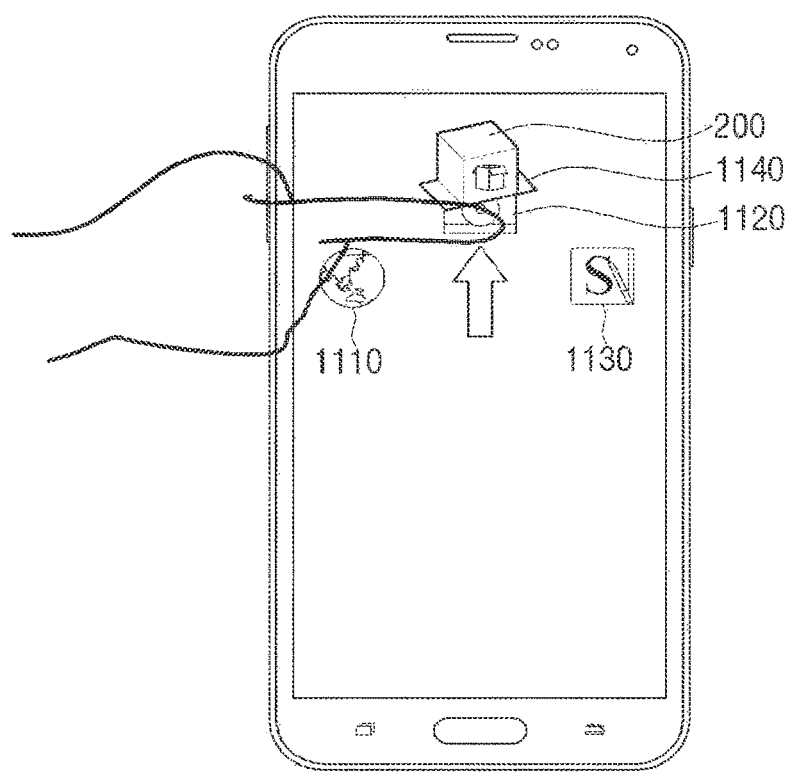

Furthermore, when a user interaction of dragging the second item 1120 to a touched area is sensed while the GUI 1140 is being displayed as illustrated in FIG. 11B, the controller 130 may store information on the second item 1120.

Figure 12A:
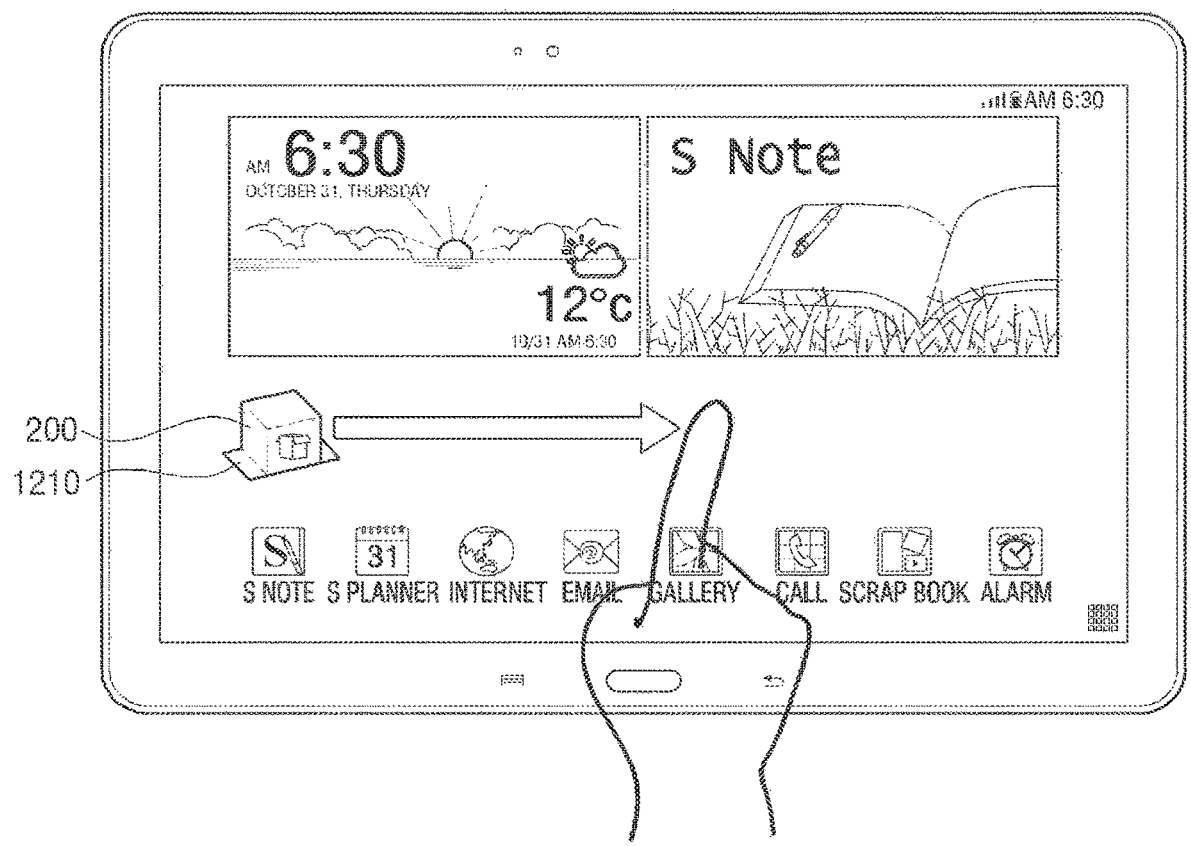

Furthermore, when a user interaction is sensed of the display of a second user terminal device being touched by a surface corresponding to the data storing function of the input device 200, wherein the second user terminal device is interlocked with the first user terminal device, the second user terminal device may, as illustrated in FIG. 12A, control the display 110 to display a GUI 1210 as if a box is being opened.

Figure 12B:
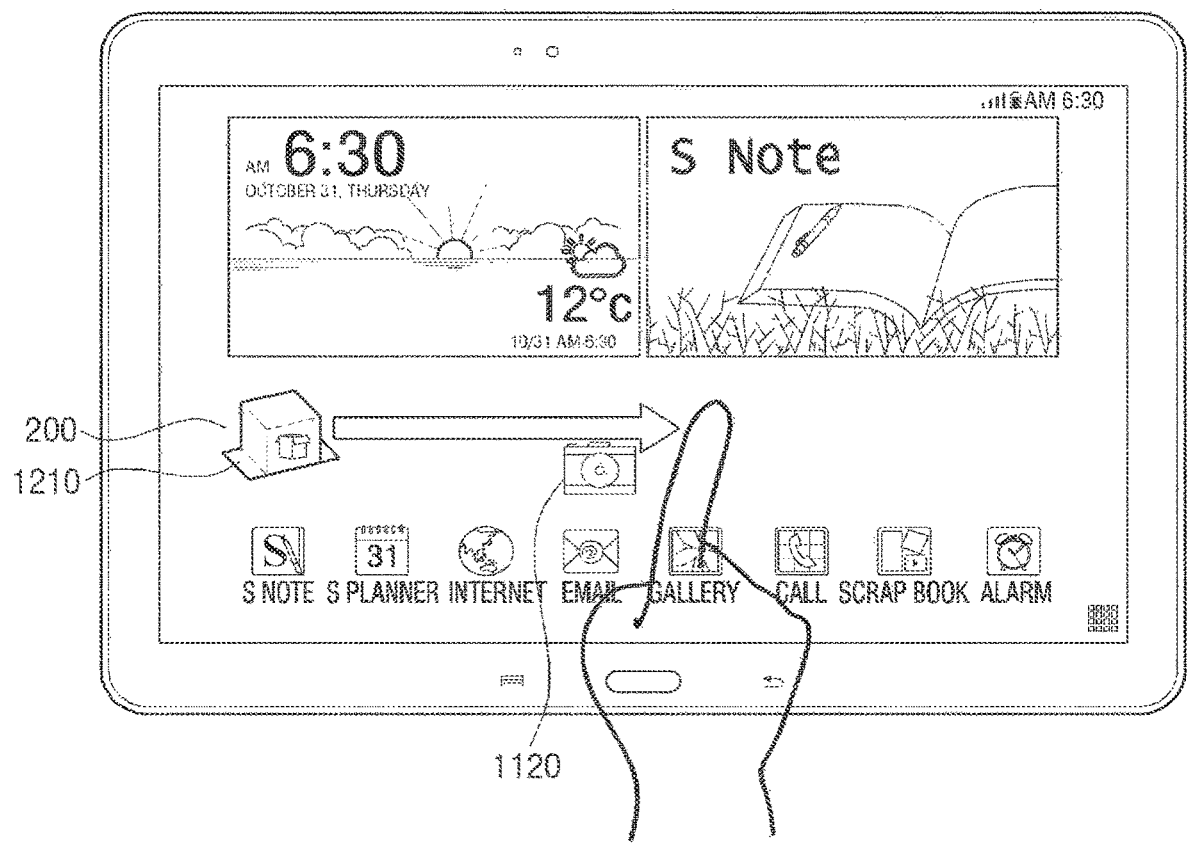

Furthermore, while the GUI 1210 is being displayed, when a flip interaction of one area near the GUI 1210 being touched and then flipped towards outside is sensed as illustrated in FIG. 12B, the second user terminal device may receive information on the second item 1120 from the first user terminal device, and as illustrated in FIG. 12B, control the display 110 such that the second item 1120 may be taken out in the sensed flip direction. Herein, the information on the second item 1110 may be received after the flip interaction is sensed in the second user terminal device, but without limitation, and thus, the information on the second item 1110 may be received while the surface corresponding to the data storing function of the input device 200 is touching the second user terminal device.

Figure 13:
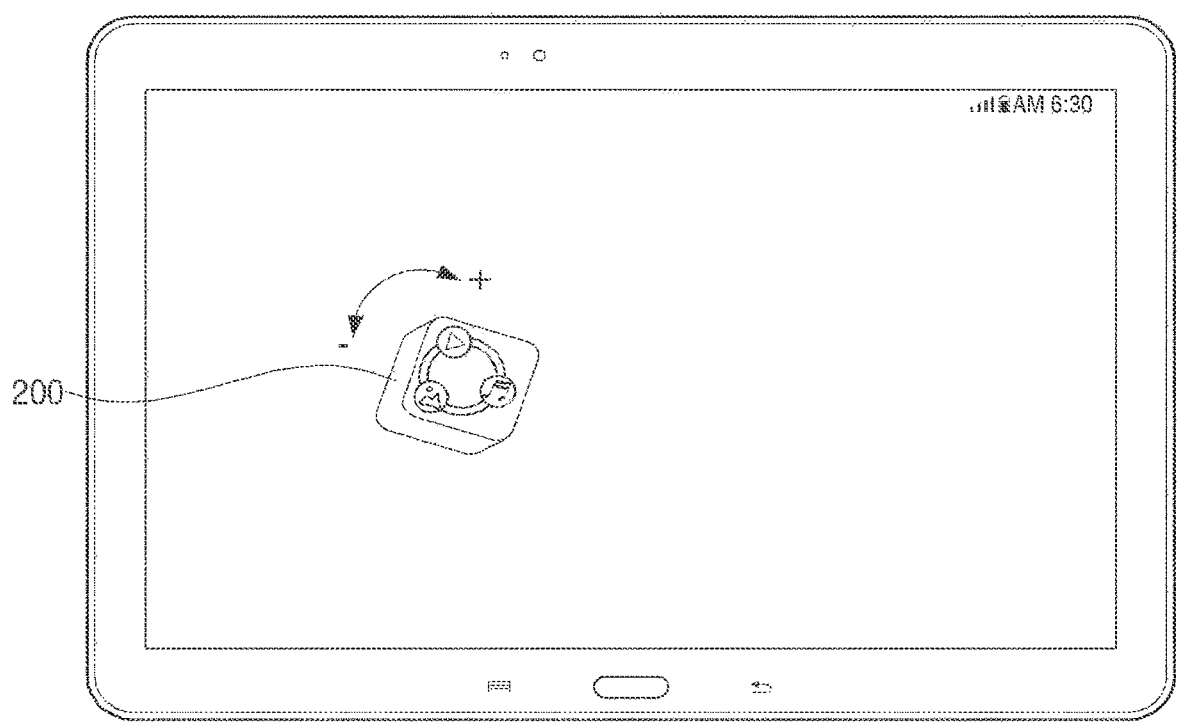

Referring to FIG. 13, when a user interaction is sensed of the input device 200 being rotated with the touch by the first surface (corresponding to the volume adjusting function) of the input device 200 on the first point of the display being maintained while the display 110 shows a waiting screen, the controller 130 may adjust the volume of the user terminal device 100 according to the interaction of the input device 200 being rotated. For example, when a user interaction is sensed of the input device 200 being rotated in a counter-clockwise direction with the touch by the surface corresponding to the volume adjusting function of the input device 200 on the first point of the display 110 being maintained while the display 110 shows a waiting screen, the controller 130 may reduce the volume of the user terminal device 100 according to the extent of rotation of the rotation interaction.

According to another embodiment of the present disclosure, it is possible to provide a network between user terminal devices that have been touched by a same surface of the input device 200.

Figure 14:
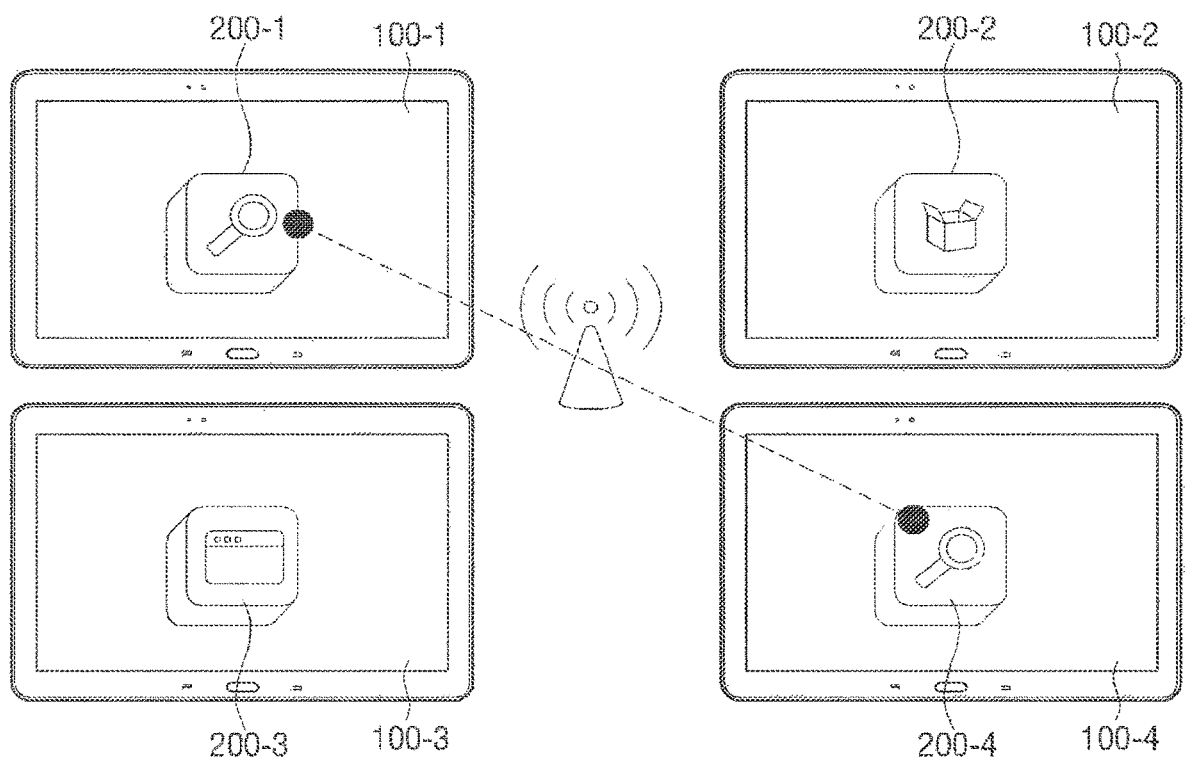

More specifically, as illustrated in FIG. 14, when each of the first to fourth user terminal devices are touched by each of a plurality of input devices 200-1 to 200-4, each of the first to fourth user terminal devices 100-1 to 100-4 may determine the touch pattern of the touched surface of each input device. For example, the first user terminal device 100-1 may determine that the touch on the first user terminal device 100-1 was made by the first surface of the first input device 200-1, that the touch on the second user terminal device 100-2 was made by the second surface of the second input device 200-2, that the touch on the third user terminal device 100-3 was made by the third surface of the third input device 200-3, and that the touch on the fourth user terminal device 100-4 was made by the fourth surface of the fourth input device 200-4. Furthermore, each of the plurality of user terminal devices 100-1 to 100-4 may share information on each of their touched patterns to create a network between the user terminal devices of which the same touch pattern has been touched. That is, a network may be created between the first user terminal device 100-1 and the fourth user terminal device 100-4 of which the same first surface has been touched among the plurality of user terminal devices 100-1 to 100-4.

According to another embodiment of the present disclosure, the controller 130 may control the display 110 to display a plurality of application items on an area surrounding the area touched by the input device 170 using the input device 170.

Figure 15A:
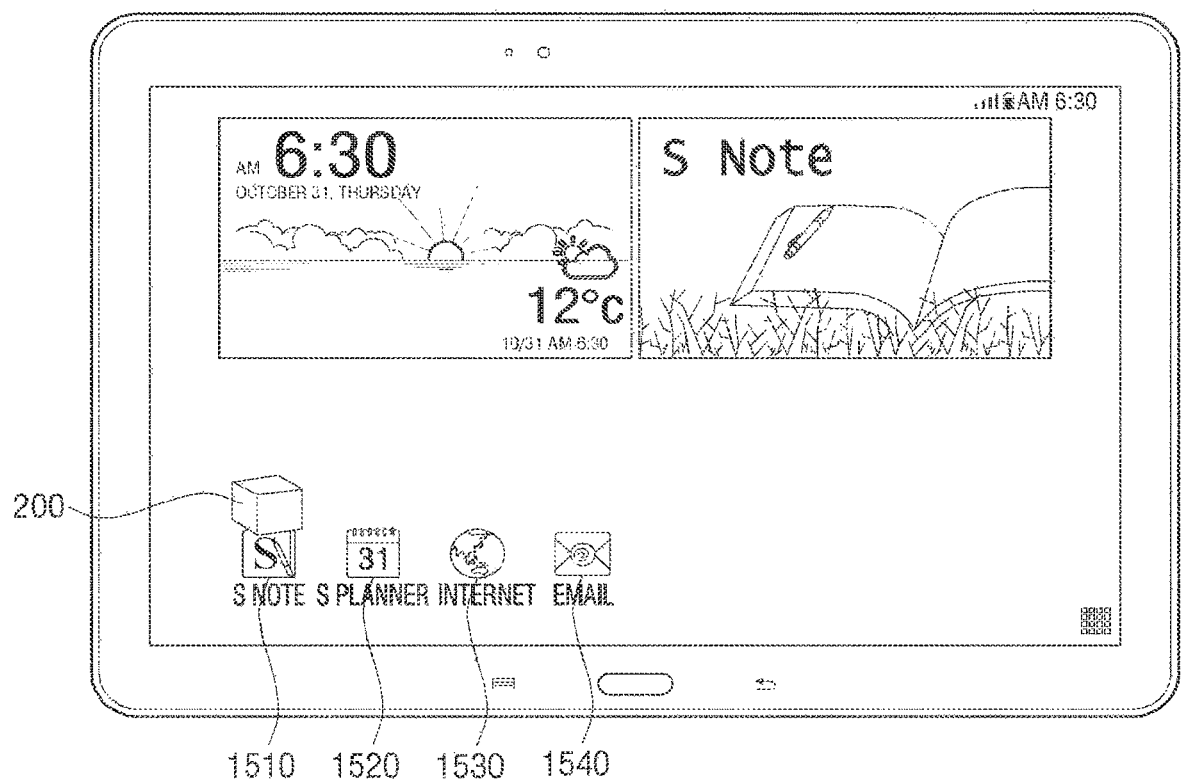
Figure 15B:
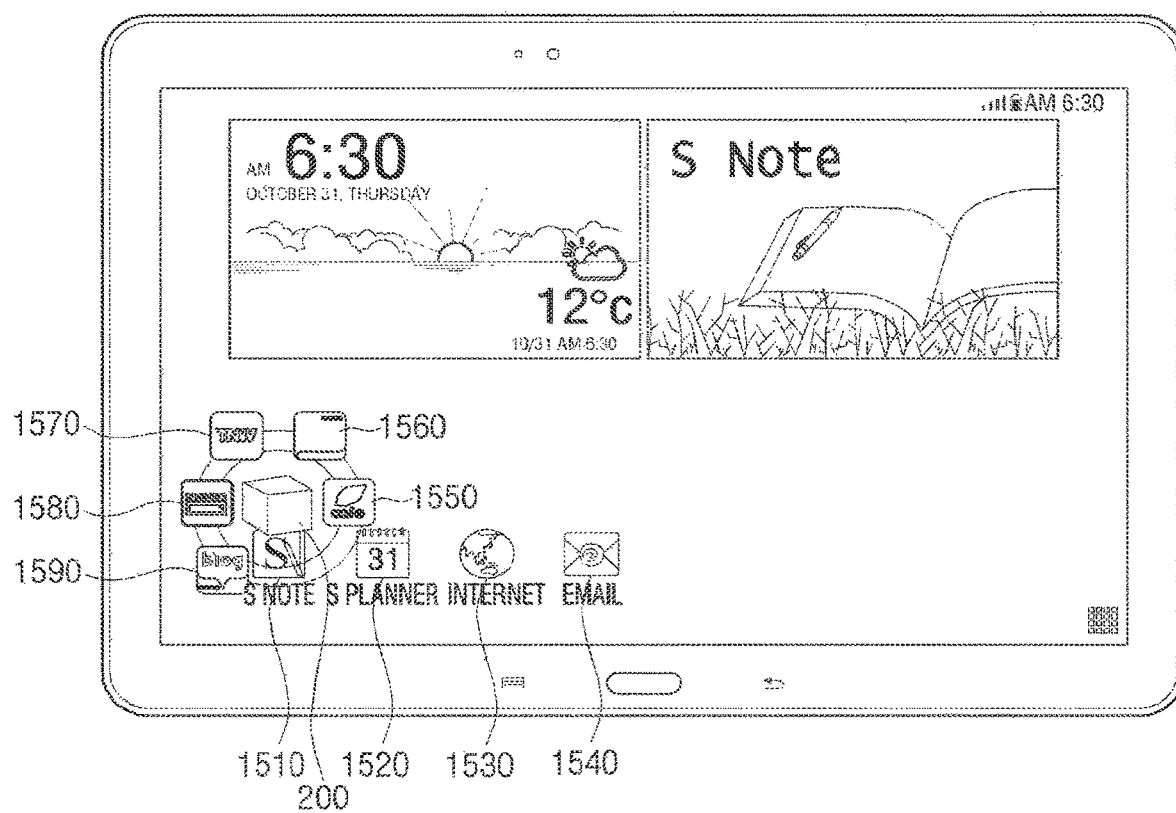

More specifically, with the plurality of items 1510 to 1540 displayed as illustrated in FIG. 15A, when an interaction is sensed of the first item 1510 being touched by the first surface (corresponding to the magnet function) of the input device 170, the controller 130 may, as illustrated in FIG. 15B, control the display 110 to display application items 1550 to 1590 related to the first item 1510 on an area surrounding the first item 1510.

Figure 16:
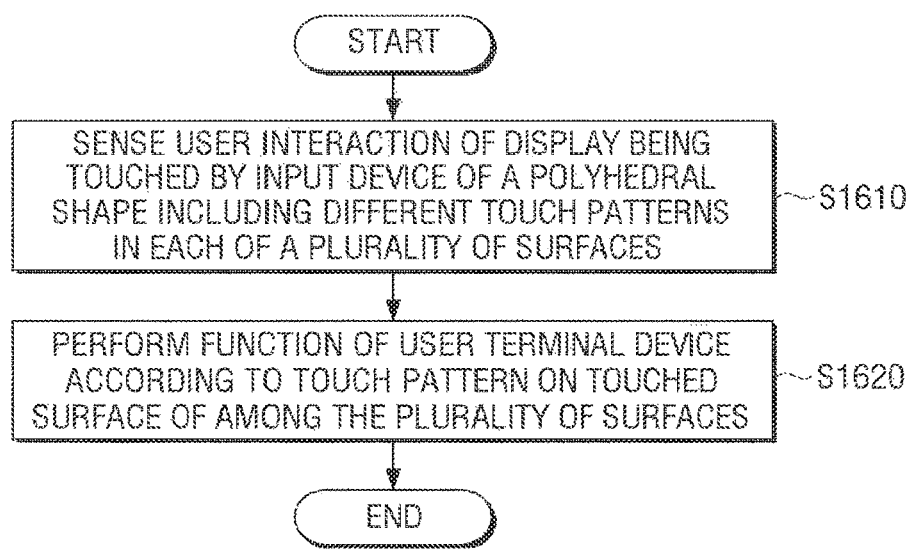
FIG. 16 is a flowchart for explaining a method for controlling a user terminal device according to an embodiment of the present disclosure.

Hereinafter, a control method of a user terminal device 100 will be explained with reference to FIG. 16.

First of all, the user terminal device 100 senses a user interaction of a touch being made by a polyhedral shaped input device that includes different touch patterns on each of a plurality of surfaces at operation S1610. Herein, examples of user interactions include various interactions such as a tap interaction, drag interaction, rotating interaction, flip interaction, turn around interaction.

Furthermore, the user terminal device 100 performs a function of the user terminal device 100 according to the touch pattern on the touched surface among the plurality of surfaces at operation S1620. More specifically, the user terminal device 100 may sense the touch pattern on the touched surface of the input device, determine the touched surface based on the sensed touch pattern, and perform the function corresponding to the touched surface determined.

By doing this, the user terminal device 100 may not only perform various manipulations through an input device having a polyhedral shape but also provide a new type of interaction where various fun elements may be added.

Meanwhile, a control method according to the aforementioned various embodiments of the present disclosure may be configured as a program and may be provided through a display device. Furthermore, a non-transitory computer readable medium storing such a program may be provided. A non-transitory computer readable medium refers to a computer readable medium that may store data semi-permanently and not for just a short period of time such as a register, cache, and memory. More particularly, the aforementioned various applications or programs may be stored in and provided through a non-transitory computer readable medium such as a compact disc (CD), digital versatile disc (DVD), hard disk, blue ray disk, universal serial bus (USB), memory card, and read only memory (ROM) and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a touch screen display; and
   a processor configured to at least:
      control to display content on the touch screen display,
      control to identify a surrounding area of a hand manipulatable input device while the hand manipulatable input device is placed over the touch screen display,
      control to, based at least on the identified surrounding area, provide a plurality of menu items on the identified surrounding area, wherein each of the plurality of menu items respectively corresponds to a function for controlling the electronic device, and
      control to, based on a drag of the hand manipulatable input device while the plurality of menu items is provided, execute a function related to a menu item corresponding to a direction of the drag.

2. The electronic device of claim 1, wherein the plurality of menu items comprise an item related to a search function.

3. The electronic device of claim 1, wherein the touch screen display is a capacitive type touch screen display.

4. A method executed by an electronic device comprising a touch screen display, the method comprising:
- displaying content on the touch screen display;
- based at least on a sensed predetermined touch pattern, identifying a surrounding area of a hand manipulatable input device while the hand manipulatable input device is placed over the touch screen display;
- based at least on the identified surrounding area, providing a plurality of menu items on the identified surrounding area, wherein each of the plurality of menu items respectively corresponds to a function for controlling the electronic device; and
- based on a drag of the hand manipulatable input device while the plurality of menu items is provided, executing a function related to a menu item corresponding to a direction of the drag.

5. The method of claim 4, wherein the plurality of menu items comprise an item related to a search function.

6. The method of claim 4, wherein the touch screen display is a capacitive type touch screen display.

7. A non-transitory computer readable recording medium storing instructions executable by a processor of an electronic device to cause the processor to at least:
- displaying content on the touch screen display;
- identifying a surrounding area of a hand manipulatable input device while the hand manipulatable input device is placed over the touch screen display;
- based at least on the identified surrounding area, providing a plurality of menu items on the identified surrounding area of the touch screen display, wherein each of the plurality of menu items respectively corresponds to a function for controlling the electronic device; and
- based on a drag of the hand manipulatable input device while the plurality of menu items is provided, executing a function related to a menu item corresponding to a direction of the drag.

8. The non-transitory computer readable recording medium of claim 7, wherein the plurality of menu items comprise an item related to a search function.

9. The non-transitory computer readable recording medium of claim 7, wherein the touch screen display is a capacitive type touch screen display.

* * * * *